US008194380B2

(12) United States Patent
Murata et al.

(10) Patent No.: US 8,194,380 B2
(45) Date of Patent: Jun. 5, 2012

(54) ENDOSCOPE APPARATUS

(75) Inventors: Masanao Murata, Tokyo (JP); Takashi Suzuki, Tokyo (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 11/567,885

(22) Filed: Dec. 7, 2006

(65) Prior Publication Data
US 2007/0230075 A1    Oct. 4, 2007

(30) Foreign Application Priority Data

Dec. 8, 2005  (JP) ................................ P2005-355359

(51) Int. Cl.
H02H 3/22        (2006.01)
A61B 1/04        (2006.01)
(52) U.S. Cl. ......................... 361/111; 600/110; 600/112
(58) Field of Classification Search .................. 600/101, 600/109
See application file for complete search history.

(56) References Cited

U.S. PATENT DOCUMENTS

| 5,225,958 | A  | * | 7/1993  | Nakamura ................... 361/55 |
| 5,228,958 | A  | * | 7/1993  | Goldstein et al. ............... 429/49 |
| 5,365,940 | A  | * | 11/1994 | Teves ............................ 600/549 |
| 5,374,953 | A  | * | 12/1994 | Sasaki et al. ..................... 348/65 |
| 6,796,939 | B1 | * | 9/2004  | Konomura et al. ........... 600/179 |
| 7,272,194 | B1 |   | 9/2007  | Mahmoud |
| 7,312,716 | B2 | * | 12/2007 | Kothari et al. ................ 340/635 |
| 2003/0109937 | A1 |   | 6/2003  | Zielinski et al. |
| 2003/0112609 | A1 | * | 6/2003  | Takami ......................... 361/748 |
| 2003/0122926 | A1 |   | 7/2003  | Kume et al. |
| 2003/0173081 | A1 | * | 9/2003  | Vinegar et al. ............. 166/272.1 |
| 2005/0272975 | A1 | * | 12/2005 | McWeeney et al. .......... 600/113 |
| 2008/0294105 | A1 |   | 11/2008 | Gono et al. |

FOREIGN PATENT DOCUMENTS

| EP | 0 071 724   | 2/1983  |
| JP | 56-162841   | 12/1981 |
| JP | 57-211111   | 12/1982 |
| JP | 57-212701   | 12/1982 |
| JP | S57-211111  | 12/1982 |
| JP | 58-176530   | 11/1983 |

(Continued)

OTHER PUBLICATIONS

Office Action issued by the Japanese Patent Office on Jul. 12, 2011 in connection with corresponding Japanese Patent Application No. 2005-355359.

(Continued)

*Primary Examiner* — Dharti Patel
(74) *Attorney, Agent, or Firm* — Ostrolenk Faber LLP

(57) ABSTRACT

A scope unit 2 including a control unit 3 and an insertion portion 4 is attached to a main unit 1 via a scope connector 5. An optical adaptor 8 is attached to a tip of the insertion portion 4. The CCD 31, HICs 32, 33, and the thermistor 34 are attached to the tip of the insertion portion 4. A liquid crystal module 36 is attached to the optical adaptor 8. A barrier circuit 64 limits energy supplied to these components in a circuit disposed in the scope unit 2. By disposing the barrier circuit 64 in the scope connector 5, the portion extending from the barrier circuit 64 to, i.e., the control unit 3, the insertion portion 4, and the optical adaptor 8 are of the explosion-proof construction. Thus, these can be used in a hazardous explosive location. Thus, an endoscope apparatus that can be used in combustible gas or dust can be provided.

22 Claims, 35 Drawing Sheets

FOREIGN PATENT DOCUMENTS

| | | |
|---|---|---|
| JP | 59-144741 | 9/1984 |
| JP | 59-179434 | 11/1984 |
| JP | 63-39683 | 3/1988 |
| JP | 05-034602 | 2/1993 |
| JP | 5-509400 | 12/1993 |
| JP | 06-100097 | 4/1994 |
| JP | 08-335450 | 12/1994 |
| JP | 07-326992 | 12/1995 |
| JP | 08-293892 | 11/1996 |
| JP | 09-065441 | 3/1997 |
| JP | 2001-075020 | 3/2001 |
| JP | 2001-075021 | 3/2001 |
| JP | 2001-275954 | 10/2001 |
| JP | 2004-070709 | 3/2004 |
| JP | 2005-165815 | 6/2005 |
| JP | 2005-311535 | 11/2005 |
| WO | WO 91/18236 | 11/1991 |
| WO | WO 03/005319 | 1/2003 |
| WO | WO 03/005391 | 1/2003 |

OTHER PUBLICATIONS

Translation of the Office Action issued by the Japanese Patent Office on Jul. 12, 2011 in connection with corresponding Japanese Patent Application No. 2005-355359.

Japanese Office Action mailed May 17, 2011 in connection with corresponding Japanese Patent Application No. 2006-019146.

English translation of Japanese Office Action issued in connection with corresponding Japanese application provided as an explanation of prior art relevancy.

Office Action issued by USPO in connection with corresponding U.S. Appl. No. 11/626,895 dated Jun. 2, 2011.

Japanese Office Action mailed Feb. 15, 2011 in connection with corresponding Japanese Patent Application No. 2006-019146.

Office Action issued by USPO in connection with corresponding U.S. Appl. No. 11/626,895 dated Dec. 14, 2011.

* cited by examiner

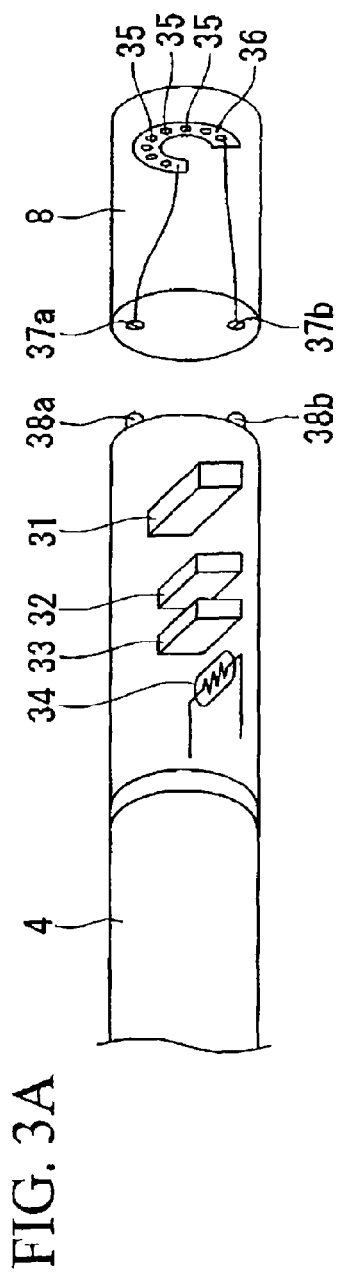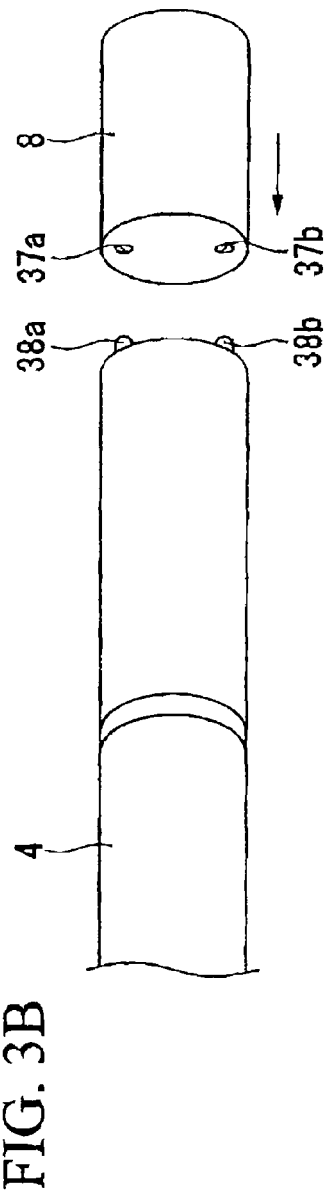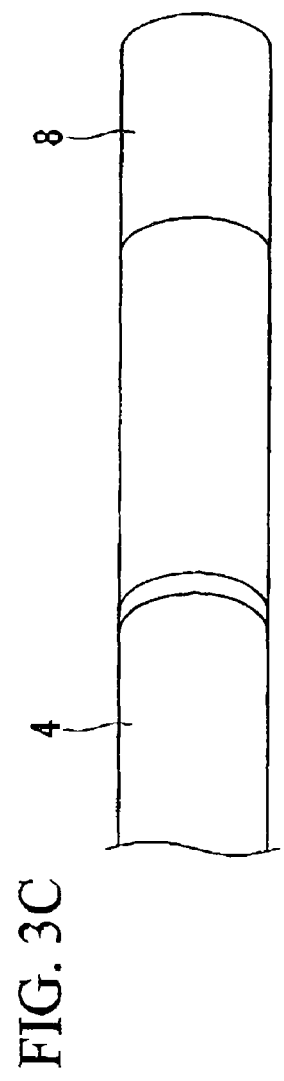

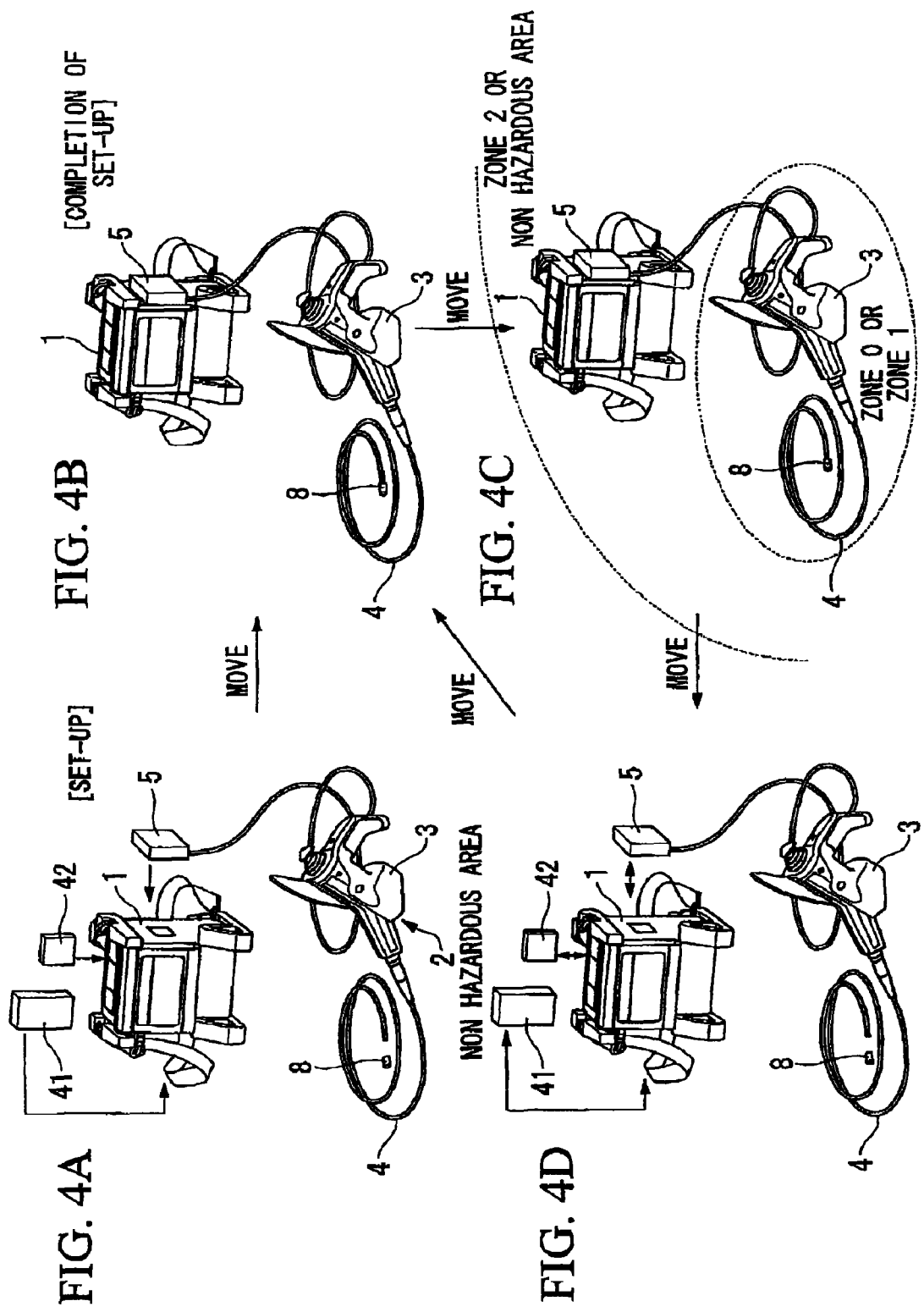

FIG. 16
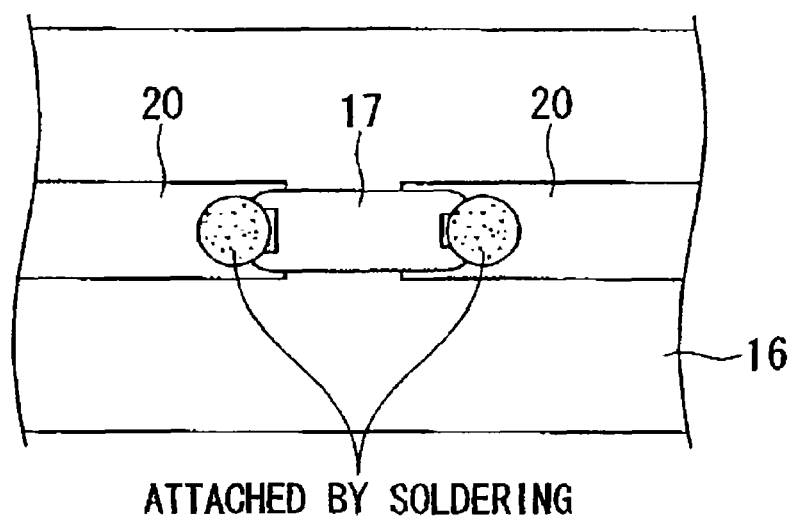
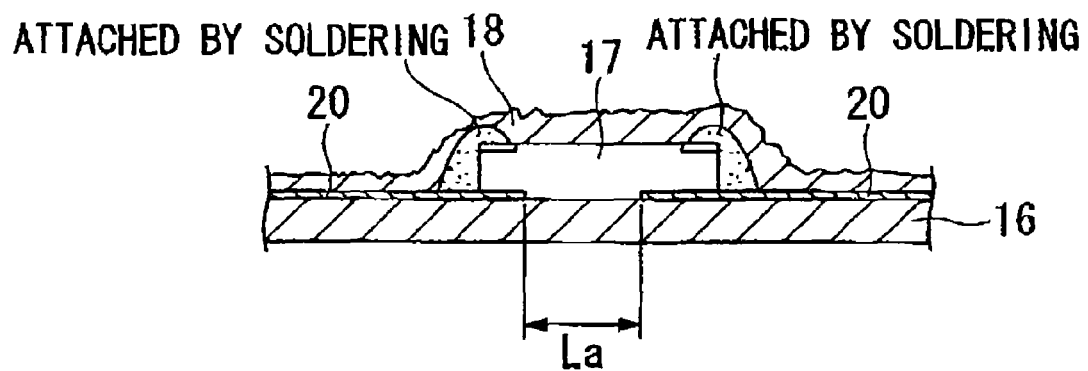

Zone2 or NH | Zone0 or 1

ENDOSCOPE APPARATUS

The present application is based on patent application No. 2005-355359 filed in Japan on Dec. 8, 2005, the content of which is incorporated herein by reference.

BACKGROUND OF THE INVENTION

1. Field of the Invention

The present invention relates to an endoscope apparatus for, for example, maintaining pipes used in plants and buildings; inspecting the inside of jet engines; and inspecting the inside of boilers. In particular, the present invention relates to an endoscope apparatus capable of being used in places potentially explosive.

2. Description of Related Art

An industrial endoscope apparatus is formed by a main unit and a scope unit attached to the main unit. An insertion portion formed by a flexible insertion tube is provided on the scope unit; and a CCD (charge-coupled-device) image pickup element is attached to a tip of this flexible insertion tube. In order to monitor the state of an object by using such an industrial endoscope apparatus, the insertion portion is inserted into the object by the tip, and the state of the object is picked up by the CCD of the tip of the insertion portion. An image signal from the CCD element is transferred to the main unit; thus the picked up image of the object is displayed in on an LCD (Liquid Crystal Display) monitor on the main unit. Such industrial endoscope apparatuses have been commonly used for, for example, inspecting and researching various aspects in plants, and maintaining pipes.

If such industrial endoscope apparatus is used in an atmosphere containing combustible air or dust, it is preferable that the device be of explosion-protection structure. For such a purpose, as disclosed in Japanese Unexamined Patent Application, First Publication No. S57-211111, an explosion-protection structure has been proposed to prevent an explosion due to a short arc caused by the contact points of a plug when it is inserted into an electric outlet socket and a part of non-flammable air is introduced into an enclosure through an air-supplying pipe communicating with the inside of the enclosure and a contact point portion of the electrical outlet.

Here, explosion-protection specification is explained. The explosion-protection specification is standardized by, for example, IEC, ATEX (Europe), FM (U.S.A.), CSA (Canada), and TIIS (Japan): and these inspection organizations inspect explosion-protection apparatuses. In the present specification, the explosion-prevention specification is explained based on the IEC standard (IEC60079). Certainly, part of Japanese regulations may substantially coincide with those of other countries, and those standards may not be excluded in the explanation hereafter.

Considering the mechanism of explosion, explosions occur due to an ignition source increasing the temperature of an atmosphere containing combustible gas or dust, and oxygen. A fuel becomes a combustible gas or dust in, for example, gasoline tanks, factories, and engines, and in the air therearound. If there is an ignition source in such a state, an explosion may be induced. Conversely, factors for explosion are, firstly combustible gas or dust, secondly, oxygen, and thirdly an ignition source, i.e., an explosion will never occur if any one of them is lacking. Therefore, an endoscope system having an explosion-protection mechanism is achieved in the present invention by eliminating those factors induced by ignition sources.

IEC 60079 classifies locations where explosion-protection apparatuses are used as Zone 0, Zone 1, and Zone 2. Zone 0 indicates the most explosive location, Zone 1 indicates a less explosive location with respect to Zone 0, and Zone 2 indicates an ven less explosive location with respect to the Zone 1. These explosive zones are defined as hazardous areas, and areas having no explosion risk are defined as non-hazardous areas.

With respect to structure, explosion-protection apparatuses are defined as, an ia apparatus, an ib apparatus, and a Type-n apparatus. An "ia apparatus" indicates the most reliable explosion-protection, and an "ib apparatus" indicates the reliability is less than that of an ia apparatus. An ia apparatus can be used in Zone 0 and Zone 1. The ib apparatus can be used only in the Zone 1. Apparatuses that can be used in the Zone 0 and the Zone 1 are called intrinsically-safe-construction apparatuses. The Type-n apparatus can be used in the Zone 2.

SUMMARY OF THE INVENTION

The present invention is an endoscope apparatus which includes a scope unit having an insertion portion inserted into an object-to-be-inspected; a main unit connected to the scope unit; and a barrier circuit for limiting energy applied to a circuit disposed in the scope unit. In addition, a portion extending from the barrier circuit is of explosion-proof construction.

In the endoscope apparatus according to the present invention, an image pickup element may be disposed on the tip of the scope unit; and the energy for driving the image pickup element is limited by the barrier circuit.

In the endoscope apparatus according to the present invention, a light-emitting element may be disposed onto the tip of the scope unit; and the energy for driving the light-emitting element is limited by the barrier circuit.

BRIEF DESCRIPTION OF THE DRAWINGS

FIGS. 3A to 3C are perspective views for explaining the configuration of the tip of the insertion portion in the endoscope apparatus according to the first embodiment of the present invention.

FIGS. 4A to 4D are views for explaining cases in which the endoscope apparatus according to a first embodiment of the present invention is used in explosive and hazardous areas.

FIG. 16 shows a plan view and a cross section of the barrier circuit used for explaining a coating treatment.

DETAILED DESCRIPTION OF THE INVENTION

The embodiments of the present invention will be explained below with reference to drawings.

(1) First Embodiment

Figure 1:
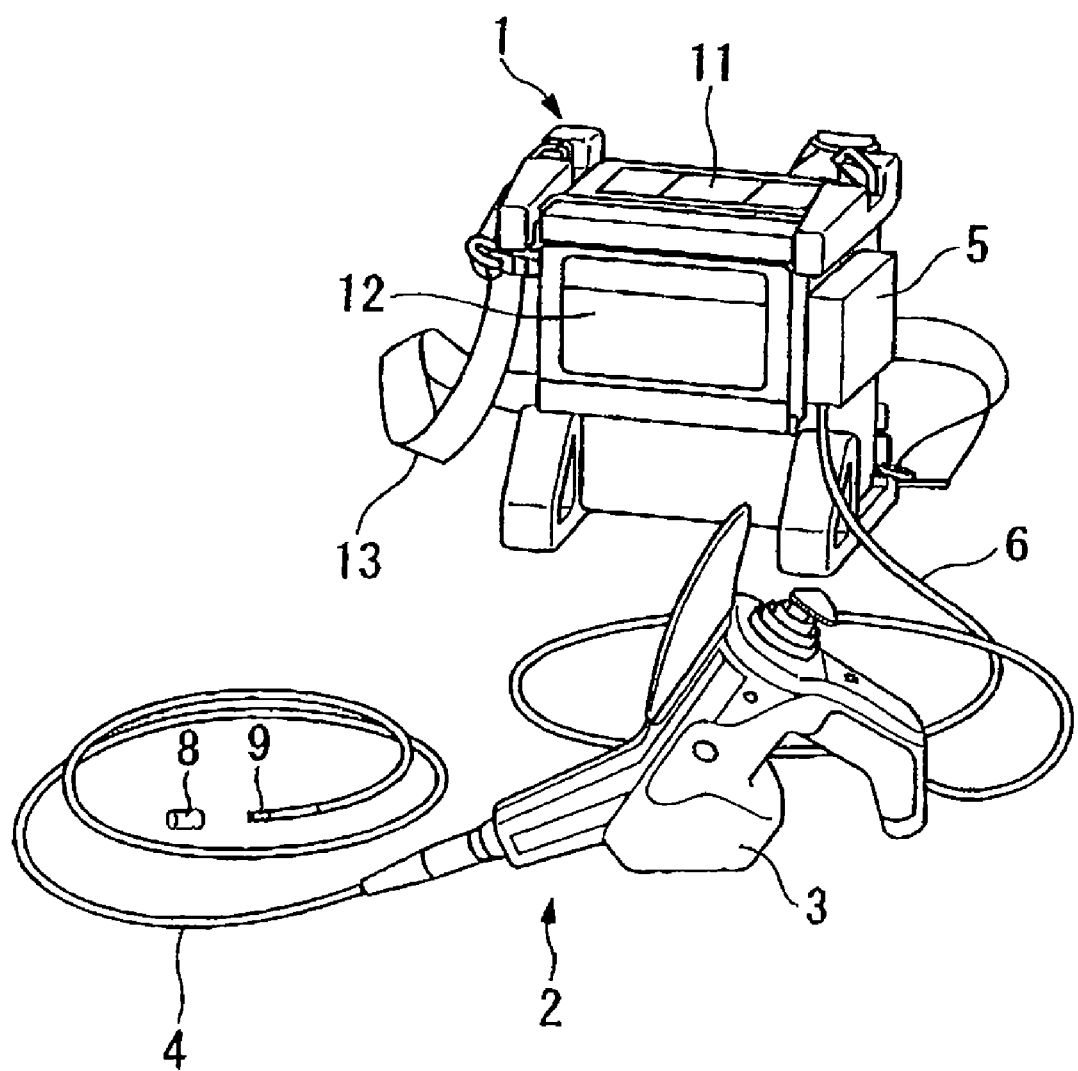
FIG. 1 is a general view of the endoscope apparatus according to a first embodiment of the present invention.

FIG. 1 is a general view of the endoscope apparatus according to the first embodiment of the present invention. In FIG. 1, a main unit 1 governs controlling an entire endoscope apparatus. A front panel 11 for carrying out various setups is disposed on a top surface of the main unit 1. An LCD monitor 12 for displaying a monitored image is attached on one of side surfaces of the main unit 1. A belt 13 can be attached to the main unit 1 so that it is carried on the shoulder of a user and hands-free operation can be conducted by the user.

A scope unit 2 is formed by a control unit 3, an insertion portion 4 attached to the control unit 3, and an optical adaptor 8 detachably attached to a tip of the insertion portion 4. The control unit 3 is attached to the main unit 1 detachably via a scope connector 5. As explained later, in the first embodiment of the present invention, a barrier circuit for limiting energy is disposed in the scope connector 5. A universal cable 6 connects between the main unit 1 and the control unit 3.

A CCD is attached to the tip of the insertion portion 4. The insertion portion 4 is flexible so as to be capable of capturing images of various objects.

Also, a bending portion 9 is disposed on the tip portion of the insertion portion 4. A motor is disposed in the control unit 3 so that the bending portion 9 can be bent vertically and horizontally by this motor. Bending the bending portion 9 enables setting arbitrary directions when capturing images.

Furthermore, an optical adaptor 8 is attached to the tip of the insertion portion 4 detachably. It is possible to vary conditions, for example, perspective angles, perspective directions, and depths of observations by replacing the optical adaptor 8 having a wide variety of optical performances.

The control unit 3 governs the control of the endoscope apparatus based on commands by the user. As shown in FIG. 2, a grip portion 21 is formed on the control unit 3. A grip portion 21 enables the user gripping it to manipulate the endoscope manually.

Figure 2A:
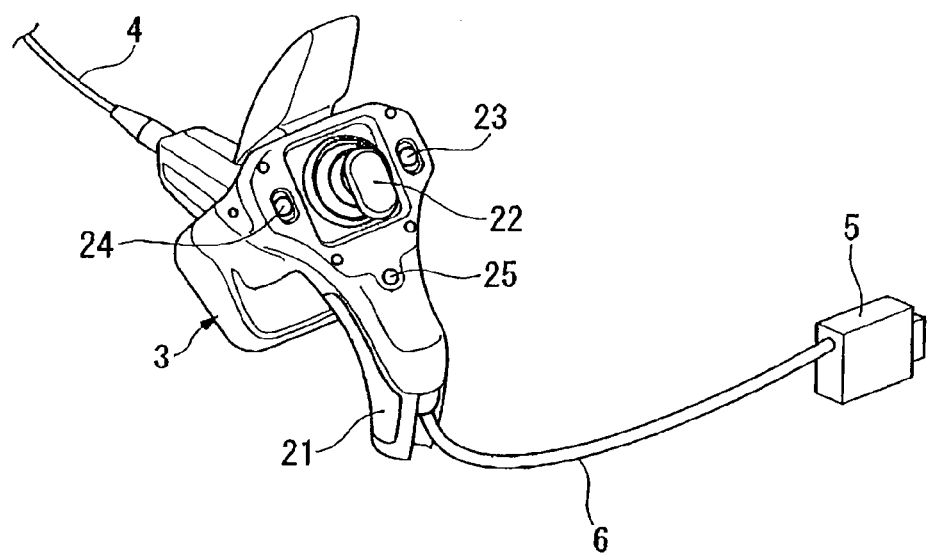
FIGS. 2A and 2B are general views of the control unit in the endoscope apparatus according to the first embodiment of the present invention.

As shown in FIG. 2A, disposed onto the control unit 3 are a joystick 22, a zoom lever 23, a brightness-adjusting lever 24, and a boost button 25. The joystick 22 is used for manipulating the direction of the bending portion 9 disposed on the tip of the insertion portion 4. The boost button 25 is used for varying the gain.

Figure 2B:
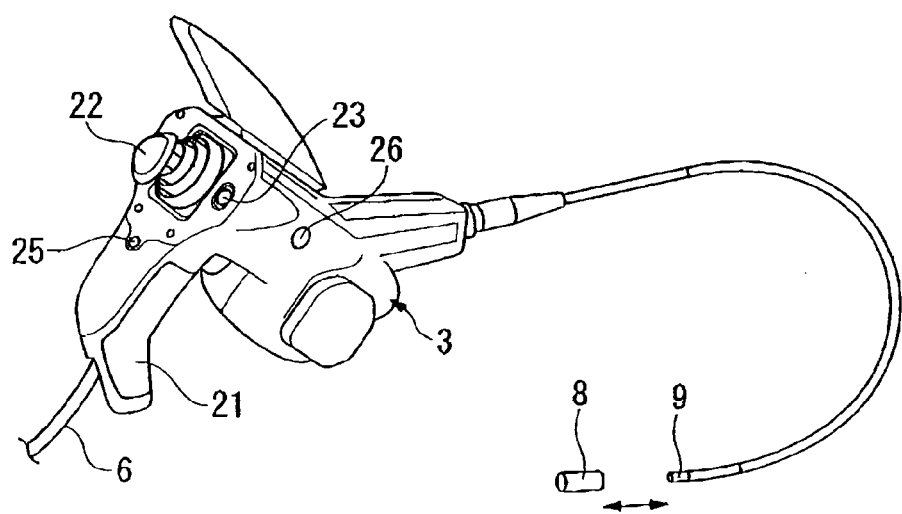

As shown in FIG. 2B, a freeze-image-recording button 26 is disposed on a side surface of the control unit 3. Upon pressing the freeze-image-recording button 26, a still image is picked up and recorded accordingly.

FIGS. 3A to 3C show configurations of the tip of the insertion portion 4 and the optical adaptor 8. As shown in FIG. 3A, disposed on the tip of the insertion portion 4 is a CCD 31, hybrid integrated circuits (hereinafter referred as HIC) 32, 33, and a thermistor 34. A buffer corresponding to output signal of the CCD 31 is implemented in the HIC 32. A comparator is implemented in the HIC 33 for reshaping waveforms of a horizontal transfer pulse. The thermistor 34 is disposed to measure the peripheral temperature of the tip portion of the scope.

Wires for transmitting signals and the power supply to these electronic circuits that are contained in the insertion portion 4, i.e., as shown in FIG. 1, are connected to the main unit 1 via universal cable 6 and a scope connector 5. To be explained later, the barrier circuit is disposed in the scope connector 5 so as to restrict signals and exceeding energy from transferring into these electronic circuits and the power supply. This enables the using of the apparatus under hazardous explosive conditions.

As shown in FIGS. 3A to 3C, a plurality of LED chips 35, 35 . . . implemented in the LED module 36 are provided in the optical adaptor 8. Upon turning these LED chips 35, 35 . . . on, the object is subject to the light emission.

Provided in the optical adaptor 8 are contact points 37a, 37b. These contact points 37a, 37b are connected to the LED module 36. Meanwhile, provided on the tip of the insertion portion 4 are contact points 38a and 38b. In order to attach the optical adaptor 8 onto the tip of the insertion portion 4, as shown in FIG. 3B, the contact points 38a and 38b make contact with the contact points 37a, 37b, and as shown in FIG. 3C, the optical adaptor 8 is fixed on the tip of the insertion portion 4. By doing this, the power is supplied to the LED chips 35, 35 . . . disposed in the LED module 36.

FIGS. 4A to 4D show, in general, how to use the endoscope apparatus according to the first embodiment of the present invention under hazardous explosive conditions.

The apparatus is set up as shown in FIG. 4A. More specifically, the set-up of the apparatus is, for example, a battery 41 and memory card 42 attached to a main unit 1; the main unit 1 connected to the scope unit 2 via the scope connector 5; and the optical adaptor 8 attached to the tip of the insertion portion 4. Infallibly, such set-up is conducted in a non-hazardous area (where the risk of an explosion is not a concern).

As shown in FIG. 4B, the endoscope apparatus is moved to the vicinity of the hazardous explosive area after being set up. Consequently, as shown in FIG. 4C, the scope unit 2 is disposed in an area (for example, area defined as Zone 0 or Zone 1), and the image of an object is picked up. In this state, as shown in FIG. 4C, the main unit 1 is disposed in a non-hazardous area or a area where explosion is less likely than other areas (Zone 2 area).

In addition, in order to replace, for example, the battery 41, the memory card 42, or the optical adaptor 8 and detach the scope unit 2, as shown in FIG. 4D, the endoscope apparatus must be moved to a non-hazardous area (where the risk of an explosion is not a concern).

Figure 5:
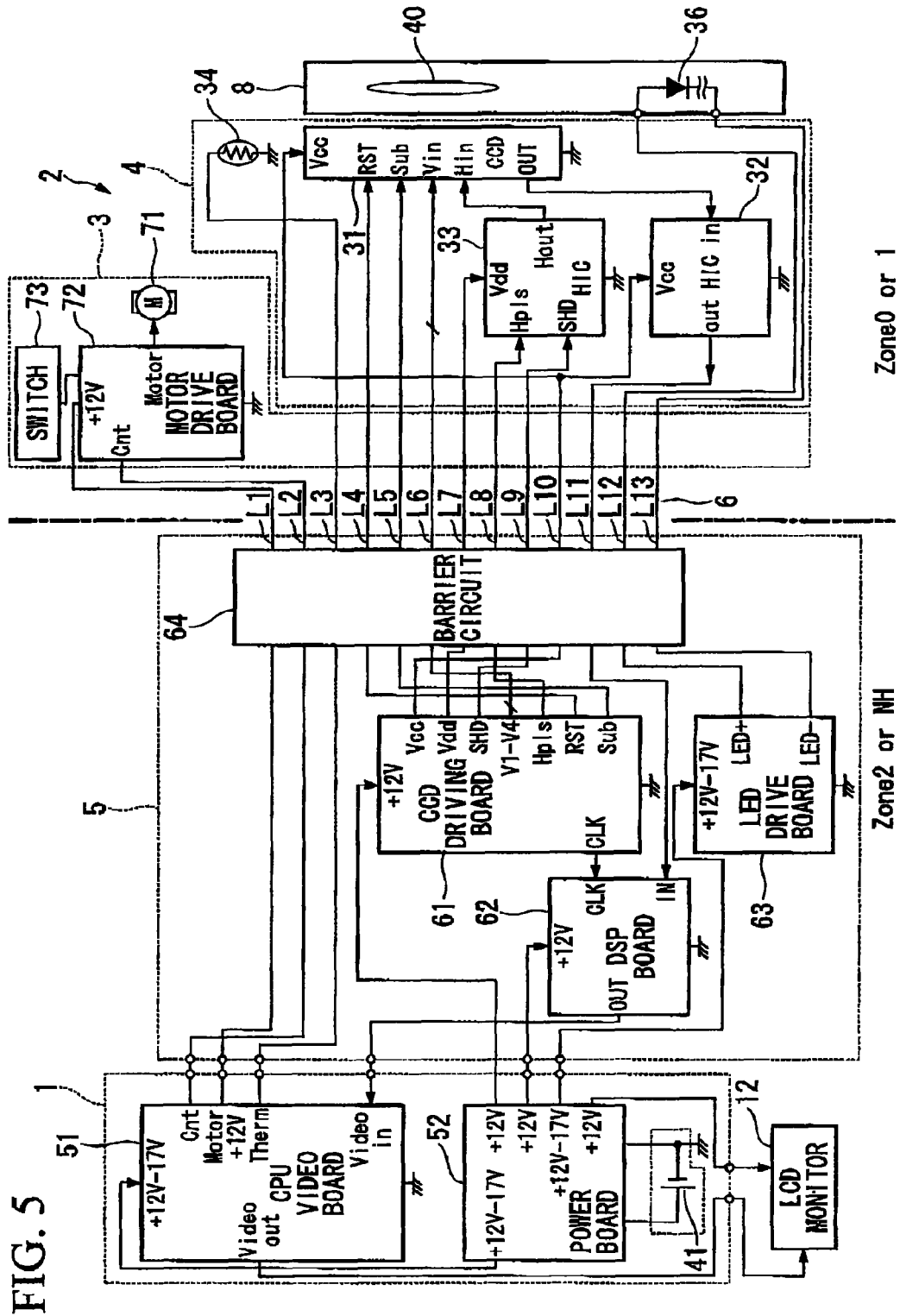
FIG. 5 is a block diagram showing an inner structure of the first embodiment of the present invention.

FIG. 5 is a block diagram showing the inner structure of the endoscope apparatus according to the first embodiment of the present invention. In FIG. 5, disposed on the main unit 1 are a CPU (central processing unit) video board 51, and a power board 52. In addition, the battery 41 is attached to the main unit 1.

The CPU video board 51 governs the control of entire endoscope apparatus. The CPU video board 51 conducts, for example, signal processing of the pickedup images, recording processing of the image signals, and control of replaying. In addition, the CPU video board 51 conducts measurement, for example, with respect to the environmental temperature measured by the thermistor 34. Furthermore, an LCD monitor 12 is attached to the main unit 1. The LCD monitor 12 displays the pickedup images.

The power board 52 supplies power to various boards using the power supplied from the battery 41.

The scope connector 5 connects the main unit 1 and the scope unit 2 (the control unit 3, the insertion portion 4, and the optical adapter 8). Provided in the scope connector 5 is, a CCD drive board 61, a DSP (Digital Signal Processor) board 62, a LED drive board 63, and the barrier circuit 64.

The CCD drive board 61 produces various signals, for example, a horizontal transfer pulse and a vertical transfer pulse, required for driving the CCD 31 and the power supply. The DSP board 62 conducts signal processing of the picked up image obtained from the CCD 31. The LED drive board 63 drives the LED module 36. The barrier circuit 64 limits the energy to various circuits (e.g., a motor-driving board 72, a motor 71, a CCD 31, a thermistor 34, the HICs 32, 33, and the LED module 36) disposed in the scope unit 2 (e.g., control unit 3, insertion portion 4, and optical adaptor 8).

Thus, since the barrier circuit 64 is disposed for limiting the energy supplied to each circuit disposed in the scope unit 2, a portion extending toward the tip thereof from the barrier circuit 64, i.e., the control unit 3, insertion portion 4, and optical adaptor 8 in the present embodiment are of explosion-proof constructions.

Provided in the control unit 3 is a motor 71, a motor-driving board 72, and a switch 73. The motor 71 bends the bending portion 9 of the tip of the insertion portion 4. Although the motor 71 may be preferably, a brushless motor in order to prevent sparks, brush motors may be used if energy for driving is not significant. The motor-driving board 72 dives this motor 71. Switch 73 corresponds to various buttons and switches (e.g., the joystick 22, the zoom lever 23, the brightness-adjusting lever 24, the boost button 25, and the freeze-image-recording button 26) manipulated by the user.

Provided onto the tip of the insertion portion 4 is, the CCD 31, the HICs 32, 33, and the thermistor 34. The CCD 31 conducts a photocurrent conversion, i.e., from the optical image of an object to an electric signal. The HIC 32 is a buffer corresponding to picked-up-image output from the CCD 3 1.

The HIC 33 reshapes the waveform of the horizontal transfer pulse with respect to the CCD 31. The thermistor 34 measures a peripheral temperature.

Provided in the optical adaptor 8 is the LED module 36 and the lens 40. The LED module 36 emits light in the vicinity of the object.

Figure 6:
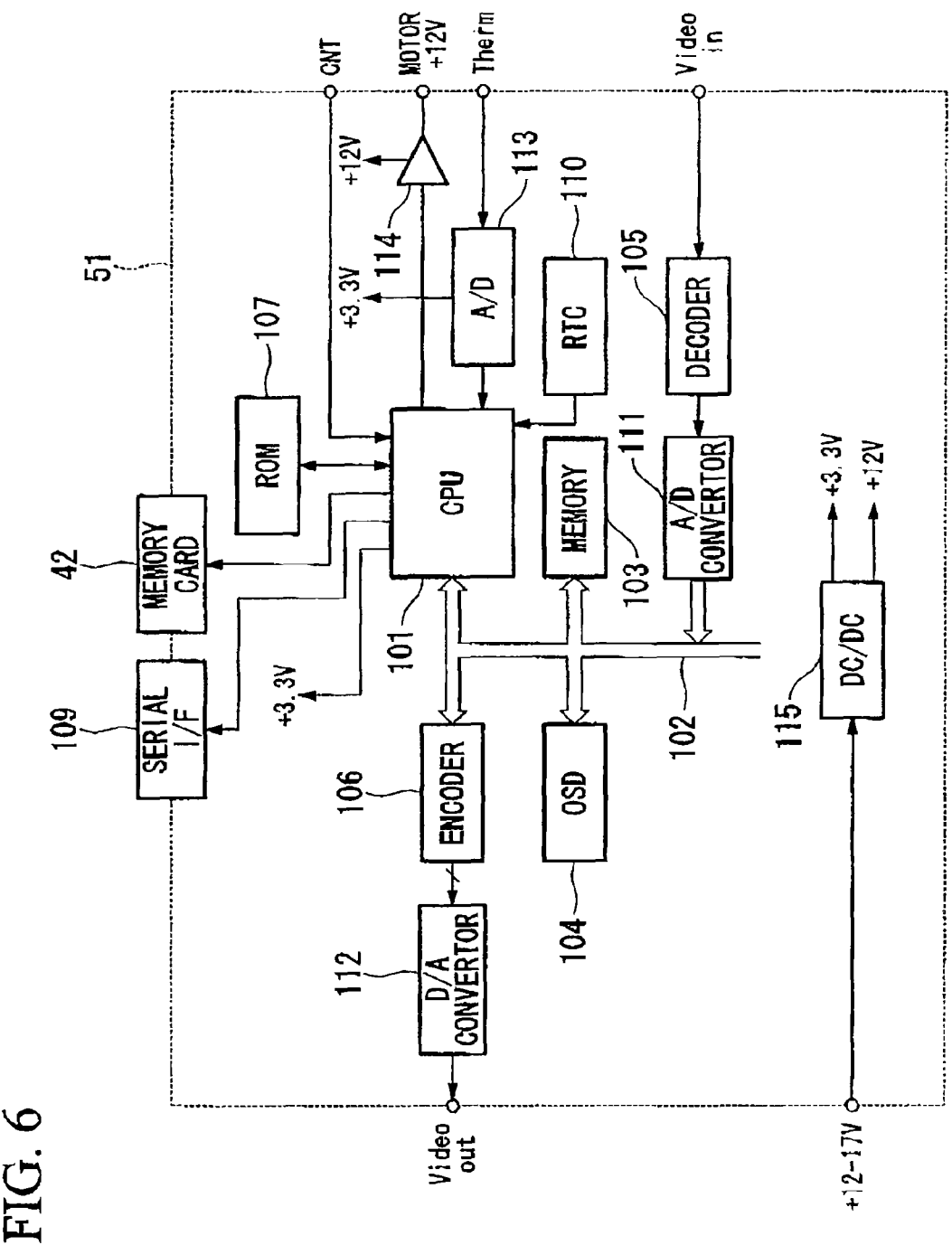
FIG. 6 is a block diagram showing a configuration of a CPU video board in the first embodiment of the present invention.

FIG. 6 shows a configuration of the CPU video board 51. As shown in FIG. 6, a CPU 101 is disposed on the CPU video board 51. Connected to a bus 102 of the CPU 101 is, a memory 103, an OSD (On Screen Display) circuit 104, an A/D converter 111, and an encoder 106. The OSD circuit 104 superimposes various display signals onto the display. A decoder 105 decodes image data of YCrCb to image data of, for example, RGB. The encoder 106 encodes the RGB image data to image data using a standard method (NTSC, etc.).

Furthermore, connected to the CPU 101 is a ROM (Read Only Memory) 107, the memory card 42, and a serial interface 109. The memory card 42 is used for storing the picked-up image. The serial interface 109 is connected to an external apparatus, for example, a personal computer. Clock is supplied to the CPU 101 from an RTC (Real Time Clock) circuit 10. The RTC circuit 110 governs the time management.

In addition, detection output from the thermistor 34 is supplied to the CPU 101 via the A/D converter 113. Furthermore, a motor-controlling signal is output from the CPU 101, and this motor-controlling signal is output to the motor-driving board 72 via the buffer 114. Moreover, a DC/DC converter 115 is disposed on the CPU video board 51.

Figure 7:
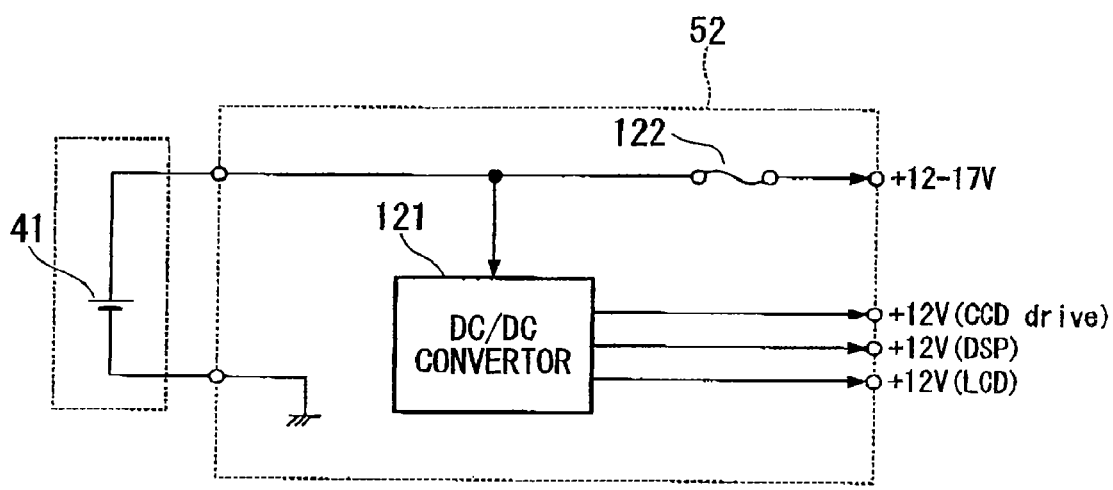
FIG. 7 is a block diagram showing a configuration of a power board in the first embodiment of the present invention.

FIG. 7 shows a configuration of the power board 52. As shown in FIG. 7, the DC/DC converter 121 is disposed in the power board 52 for producing power supplied from the battery 41 to various sections. In addition, a fuse 122 is disposed on a power supply line from the battery 41.

Figure 8:
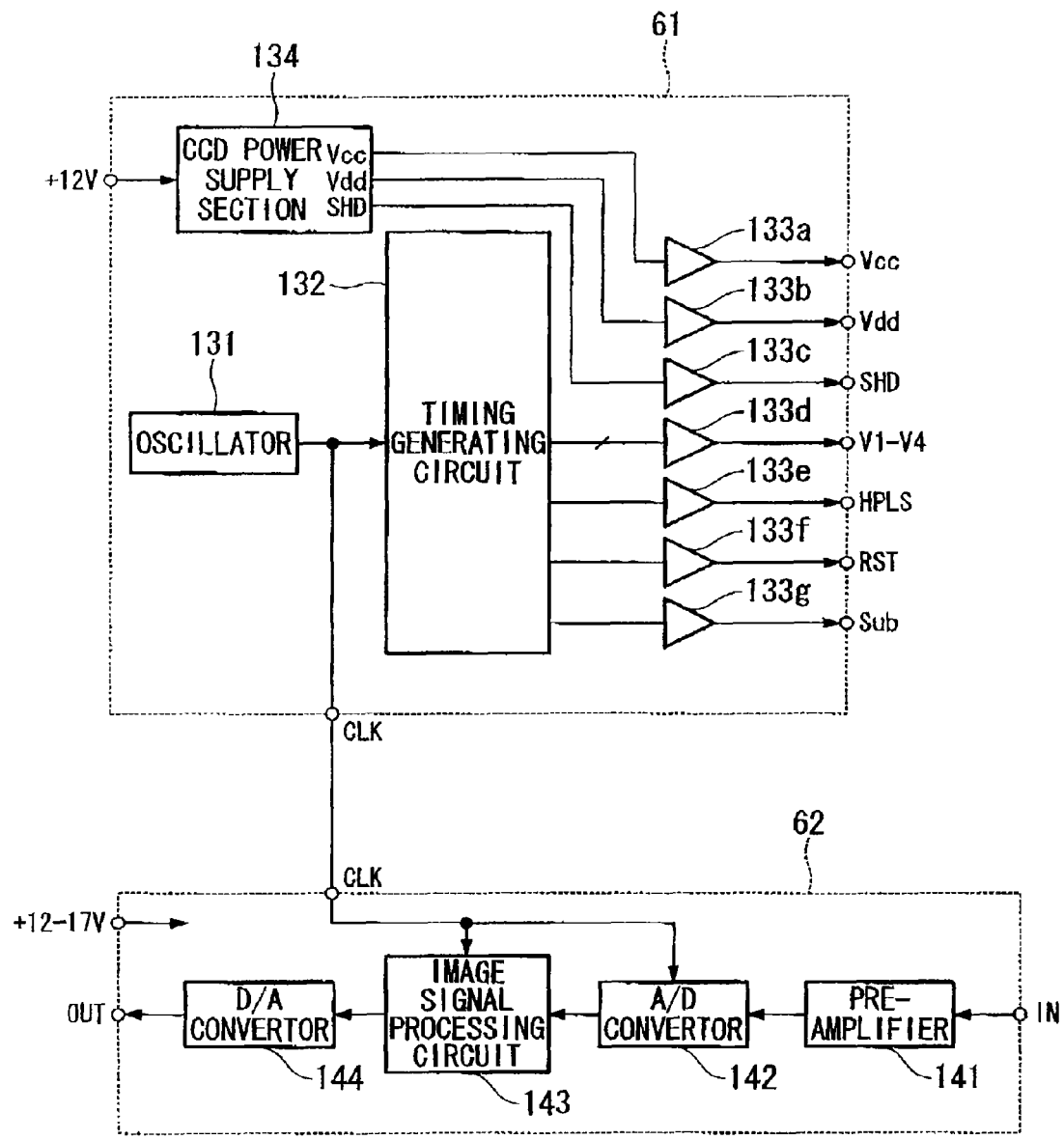
FIG. 8 is a block diagram showing a configuration of a CPU-drive board and a DSP board in the first embodiment of the present invention.

FIG. 8 shows a configuration of the CCD drive board 61 and the DSP board 62. As shown in FIG. 8, the CCD drive board 61 is provided with a clock-oscillator 131 and a timing-signal-producing circuit 132. The timing-signal-producing circuit 132 produces various signals (for example, vertical pulses V1 to V4, a horizontal transfer pulse HPLS, a reset-pulse RST, and a sub-pulse Sub) for driving the CCD. A CCD power supply section (Vcc, Vcc, and SHD) 134 drives the CCD 31. An SHD (threshold voltage) is a reference voltage for a comparator which reshapes waveforms of a horizontal pulse. This power is supplied and signals are output to the CCD 31 via the buffers 133a to 133g.

As shown in FIG. 8, the DSP board 62 is provided with a pre-amplifier 141, an A/D converter 142, an image-signal-processing circuit 143, and a D/A converter 144. A clock is supplied from the CCD drive board 61 to the DSP board 62. A signal of a picked-up image from the CCD 31 is amplified by the pre-amplifier 141 and converted into digital data by the A/D converter 142. Consequently, they are processed in the image-signal-processing circuit 143, for example, a defect correction, and a white balance correction. Further, the picked-up image signal is converted to YCrCb image data by the image-signal-processing circuit 143. The image data is converted into an analog signal by the D/A converter 144 and output from there.

Figure 9:
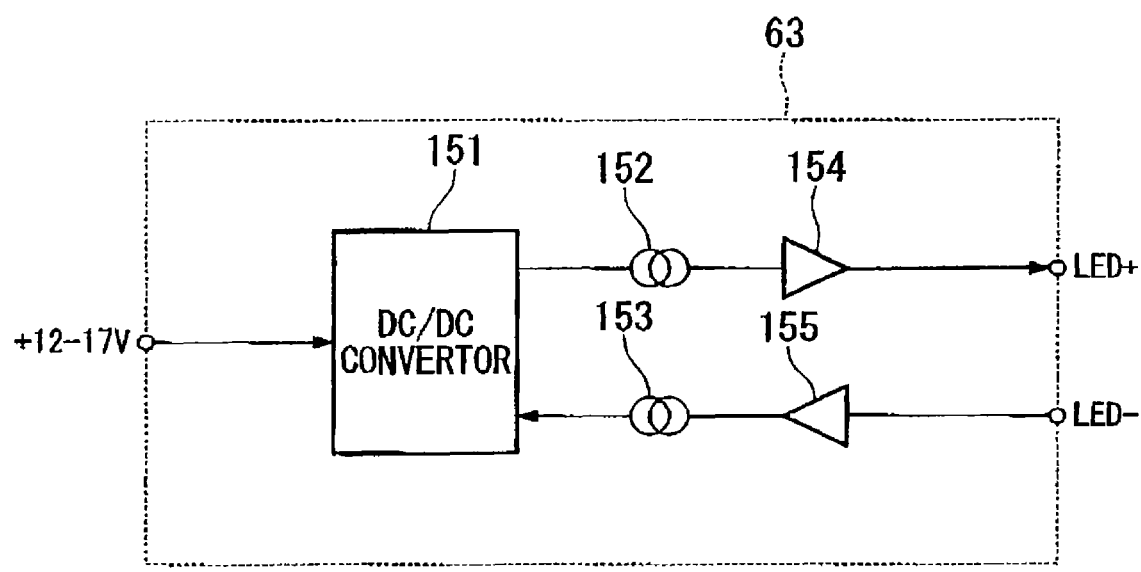
FIG. 9 is a block diagram showing a configuration of an LED-drive board in the first embodiment of the present invention.

FIG. 9 shows a configuration of the LED drive board 63. Provided on the LED drive board 63 is a DC/DC converter 151, constant current circuits 152 and 153, and buffers 154 and 155. The DC/DC converter 151 produces positive voltage for driving the LED and negative voltage for driving the LED. A constant current circuit 152 sets the positive current for driving LED and a constant current circuit 15 sets he negative current for driving the LED.

Now, the current for driving the LED is at positive side and negative side with respect to ground in view of explosion protection That is, if voltage for driving LED is Vf normally, the voltage of Vf is applied to the LED with respect to ground. In contrast, +Vf/s and −Vf/2 are applied to the LED in the present embodiment. Accordingly, it is advantageous for explosion protection because the voltage with respect to ground is ½ while the voltage Vf applied to the LED is unchanged. For example, since limitation to a creepage distance of the barrier circuit is strict if it exceeds +30 V in the regulation with respect to the intrinsically-safe-construction based on IEC 60079-11, for example, ±20V or lower is preferable; thus, utilizing ±15 V is advantageous in view of the explosion-protection regulation.

Figure 10:
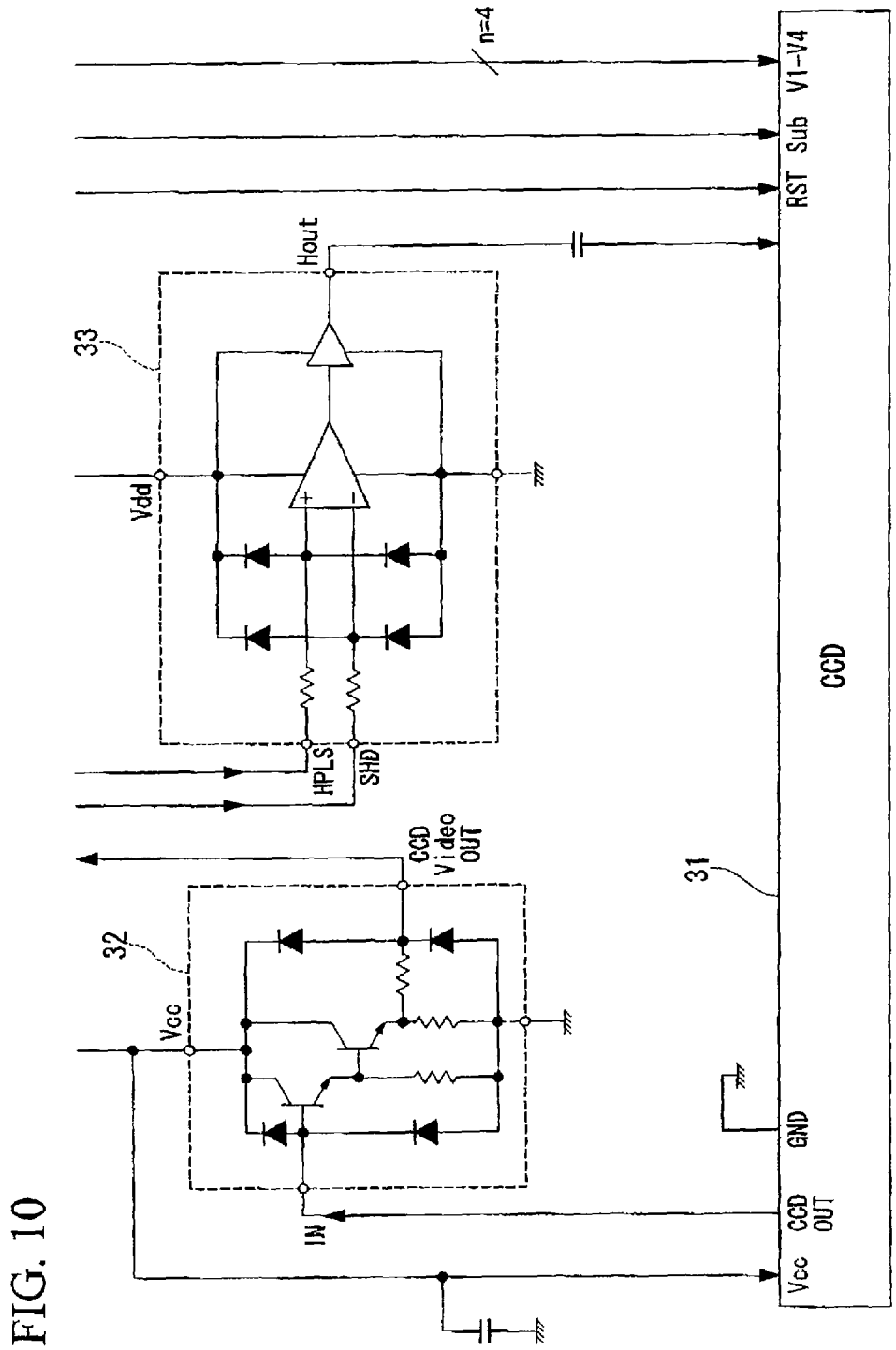
FIG. 10 is a connection diagram used for explaining a circuit configuration in a tip portion of the insertion portion in the first embodiment of the present invention.

FIG. 10 shows a configuration of the tip of the insertion portion 4. In FIG. 10, the HIC 33 is provided with an input terminal for SHD power supply, an input terminal for horizontal transfer pulse HPLS, an input terminal for Vdd power supply, the ground terminal, and an output terminal for the horizontal transfer pulse. The HIC 33 reshapes the waveform of the horizontal transfer pulse input via the comparator and outputs it. This horizontal transfer pulse is supplied to an input terminal of the horizontal transfer pulse in the CCD 31.

In addition, the CCD drive board 61 supplies a Vcc power supply, four vertical transfer pulses V1 to V4, the reset-pulse RST, and the sub-pulse Sub to the CCD 31 directly.

The HIC 32 is provided with an input terminal for Vcc power supply, an input terminal of CCD Out signal, the ground terminal, and an output terminal of CCD video signal. The signal output from the CCD 31 is put into the HIC 32. Furthermore, it is output via a buffer forming the HIC 32 and transferred to the DSP board 62.

Operation of the endoscope apparatus will be explained according to the first embodiment of the present invention shown in FIG. 5.

In FIG. 5, the image ray of an object introduced via a lens of the optical adaptor 8 is focused on a light-receiving surface of the CCD 31 on the tip of the insertion portion 4. The CCD 31 is driven by vertical pulses V1 to V4 from the CCD drive board 61 and a horizontal transfer pulse HPLS transferred from the CCD drive board 61 via the HIC 33. The signal of a picked-up image is output from the CCD 31. This signal of the picked-up image is transferred to the DSP board 62 via the HIC 32.

As shown in FIG. 8, the signal of the picked-up image from the CCD 31 is amplified by the pre-amplifier 141 on the DSP board 62 and converted into digital data by the A/D converter 142. Consequently, they are processed in the image-signal-processing circuit 143, for example, a defect correction, and white balance correction. Further, the picked-up image signal is converted to YCrCb image data by the image-signal-processing circuit 143. The image data is converted to an analog signal by the D/A converter 144 and output from there.

In FIG. 5, the output signal from the DSP board 62 is supplied to the CPU video board 51. As shown in FI(T 6, the image signal from the DSP board 62 is transferred to the decoder 105 and converted into the RGB image signal, etc., by the decoder 105. This image signal is digitized by the A/D converter 111, transferred to the bus 102, and stored in the memory 103 temporarily.

Various processing is conducted to image data stored in the memory 103. The image data is transferred to the encoder 106 via the bus 102. The RGB data is converted into image data using a standard method by the encoder 106. The image data is converted into at analog signal by the D/A converter 112, output therefrom, and transferred to the LCD monitor 12.

In addition, in order to import the image, the image data stored in the memory 103 is read out, transferred to the memory card 42, and stored in the memory card 42.

Consequently, the barrier circuit 64 in the first embodiment of the present invention will be explained in detail. As explained previously, the barrier circuit 64 is disposed in the scope connector 5 so as to prevent excessive energy from transferring to the electronic circuit disposed in the scope unit 2. In order to be separate from the intrinsically-safe portion on the substrate, the barrier circuit 64 ensures a creepage distance on the circuit.

Figure 11A:
FIGS. 11A to 11G are connection diagrams used for explaining a barrier circuit in the first embodiment of the present invention.

FIGS. 11A to 11G and 12A to 12E show examples of the barrier circuit 64. As shown in FIG. 11A, a high resistance 201 is inserted in a line (L3 in FIG. 5) corresponding to the thermistor 34 so as to limit energy. In this state, the thermistor 34 detects variance of resistance due to the temperature and measures the temperature. Therefore, energy-limiting circuits capable of detecting variance of potential are used. It is preferable that the resistance in the energy-limiting circuit in the thermistor should be selected based on varying the resistance of the thermistor 34, for example, 1 kΩ to 10 kΩ would be appropriate. Also, three zener diodes 240a, 240b, 240c are connected to a resistance 201-2 for limiting a normal rating current of the resistance 201.

Figure 11B:

In the barrier circuit 64, as shown in FIG. 11B, the fuse 202, three zener diodes 203a, 203b, 203c, and a resistance 204 are inserted in a line (L10 in FIG. 5) corresponding to the Vcc power supply so as to limit direct-current energy.

How to select the fuse 202, three zener diodes 206a, 206b, 206c, and resistance 204 will be explained here. The zener voltage Vz in three zener diodes 206a, 206b, 206c do not reach breakdown voltage from Vcc+15V, and in a normal operation state, the zener voltage Vz is selected so that the Vcc+15V is output to L7. In the example shown in FIG. 11A, zener diodes having Vz=18V may be selected preferably.

With respect to the value of the fuse 202, fuses will not blow in a normal circuit operation. When an abnormal voltage is applied to the Vcc+15V terminal, the fuse 202 operates and functions so as to restrict it within the normal rating of the zener diodes 206a, 206b, 206c. For example, if the normal operation current is approximately 10 mA, a fuse having approximately 50 mA of normal rating may be preferably selected.

The resistance 204 limits the zener voltage produced by the zener diodes 206a, 206b, 206c by resistance when abnormal voltage is applied to the Vcc+15V terminal. Although current can be limited in proportion with resistance value, if the resistance value is significant, there is a problem of fallout of potential due to the resistance 204 under normal operation. Therefore, it is necessary to reduce the fallout of potential under normal operation while limiting energy due to an abnormality. For example, it is preferable to use a resistance 204 having approximately 100Ω because it limits the energy due to abnormality and adjusts the fallout of potential in normal operation to an adequate level.

Energy applied from this Vcc+15 V in the above example will be shown as follows:

fuse 202=50 mA three zener diodes 206a, 206b, 206c=18V (normal rating, maximum rating: 18.9V)

in the event of resistance 204=82Ω

Maximum current value based on the explosion-protection regulation is 18.9V/82Ω=230 mA (in accordance with the explosion-protection regulation, the limitation of fuse 202 having 50 mA is not used in the calculation).

then, 18.9V×230 mA=4347 mW is obtained; designed energy flowing into the Vcc+15 W line is approximately 4 W.

Figure 11C:
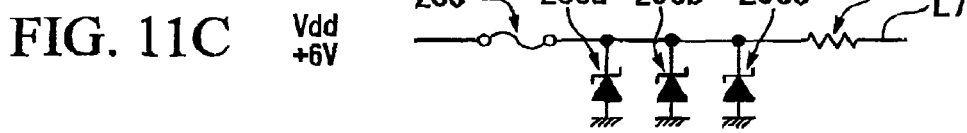

In the barrier circuit 64, as shown in FIG. 11C, the fuse 205, three zener diodes 206a, 206b, 206c, and a low resistance 207 are inserted in a line (L7 in FIG. 5) corresponding to the Vdd power supply so as to limit direct-current energy.

Based on the same idea explained with respect to Vcc+15 V, a fuse, a zener diode, and a resistance value are selected with respect to Vdd+6V. However, approximately 7.2 V of zener voltage as a normal rating may be used preferably if voltage Vdd is 6V. In addition, the energy applied from this line can be calculated based on the same idea as explained with respect to the above Vcc+15V.

Figure 11D:
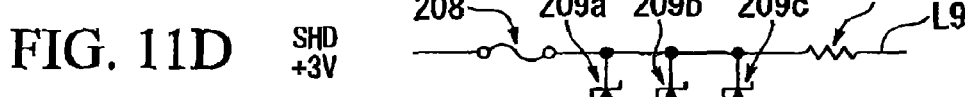

In the barrier circuit 64, as shown in FIG. 11D, a fuse 208, three zener diodes 209a, 209b, 209c, and a resistance 210 are inserted in a line (L9 in FIG. 5) corresponding to the SHD power supply so as to limit direct-current energy. Hereinafter, how to select fuses, zener diodes, and resistance vales and how to calculate energy applied from these lines are the same as those previously explained method.

Figure 11E:
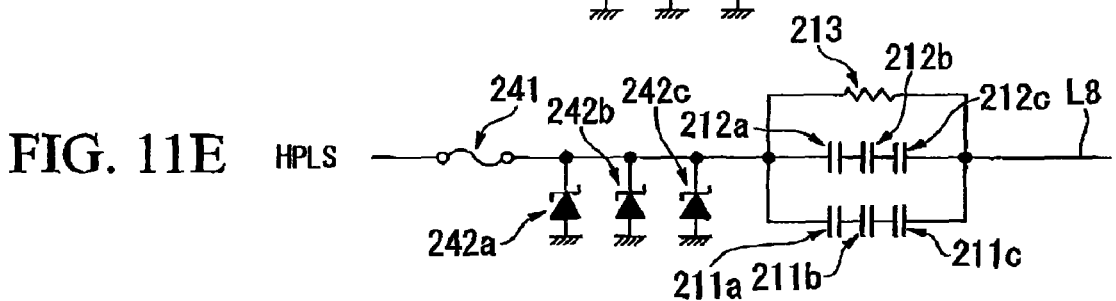

In the barrier circuit 64, as shown in FIG. 11E, a differentiating circuit including condensers 211a to 211c, condensers 216a to 212c, and a resistance 213 are inserted in a line corresponding to a line (line L8) for the horizontal transfer pulse HPLS so as to be used as an energy-limiting circuit. In this state, the condensers 211a to 211c and the condensers 216a to 212c are circuits for limiting alternating-current energy. The direct-current energy is limited by a configuration including the fuse 241, three zener diodes 246a, 242b, 242c, and the resistance 213. By doing this, the alternating energy is limited by three serial condensers, and the direct-current energy is limited by the fuses, zener diodes, and resistances based on formats shown in FIGS. 11B to 11D.

Figure 11F:
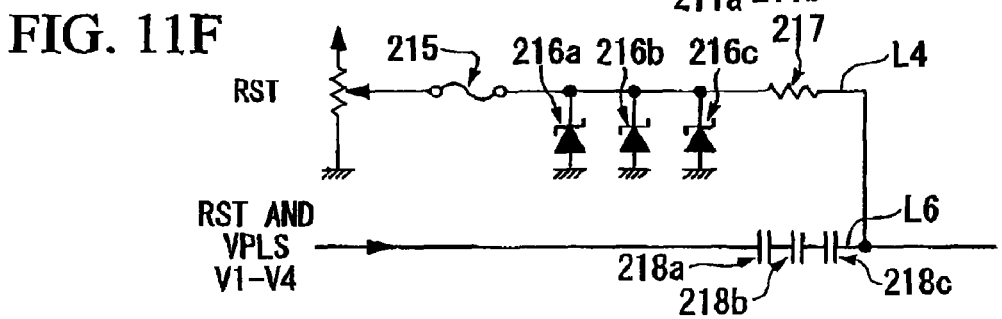

In the barrier circuit 64, as shown in FIG. 11F, a fuse 215, zener diodes 216a, 216b, 216c, and a resistance 217 are inserted in a line for the reset-pulse RST (line L4 shown in FIG. 5) and lines for vertical transfer pulses V1 to V4 (line L6 shown in FIG. 5) so as to limit the direct-current energy having direct current bias and limit energy having alternating components by the three coupling condensers 218a, 218b, 218c.

Figure 11G:
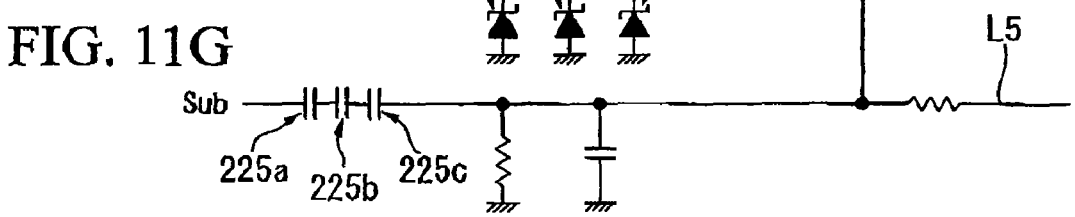

In the barrier circuit 64, as shown in FIG. 11G, a fuse 221, zener diodes 226a, 222b, 222c, and a resistance 223 are inserted in a line for the sub-pulse Sub (line L5 shown in FIG. 5) so as to limit the direct-current energy having direct current bias and limit energy having alternating component by the three coupling condensers 225a, 225b, 225c.

Figure 12A:
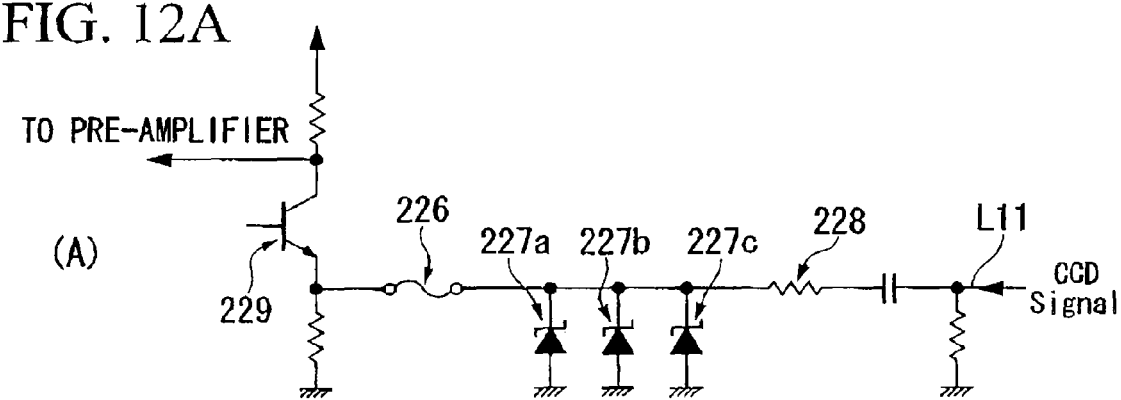
FIGS. 12A to 12E are also connection diagrams used for explaining a barrier circuit in the first embodiment of the present invention.

In the barrier circuit 64, as shown in FIG. 12A, a fuse 226, three zener diodes 227a, 227b, 227c, and a resistance 228 are inserted in a line for signal output from the CCD 31 (line 11 shown in FIG. 5) so as to limit the direct-current energy. In addition, the resistance 228 functions as an impedance-matching resistance for balancing an input connected to the scope connector 5 and an output connected to the CCD 31.

Figure 12B:
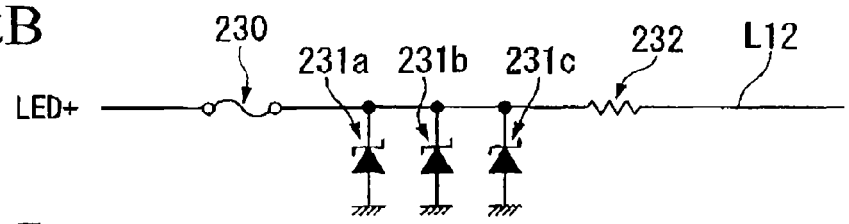

In the barrier circuit 64, as shown in FIG. 12B, a fuse 230, three zener diodes 231a, 231b, 231c, and a resistance 232 are inserted in a positive line for LED emission (line L12 shown in FIG. 5) so as to limit direct-current energy.

Figure 12C:
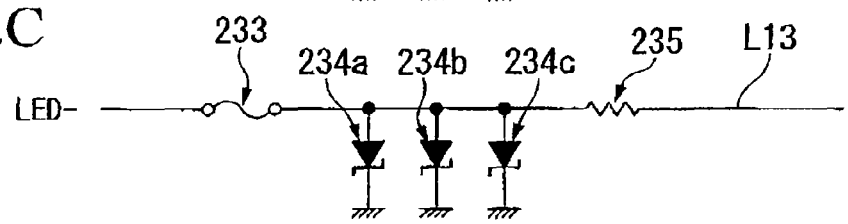

In the barrier circuit 64, as shown in FIG. 12C, a fuse 233, three zener diodes 234a, 234b, 234c, and a resistance 235 are inserted in a negative line for LED emission (line L13 shown in FIG. 5) so as to limit direct-current energy. Furthermore, the zener diode having negative voltage is connected reversely with respect to the rest of barrier circuits.

Figure 12D:
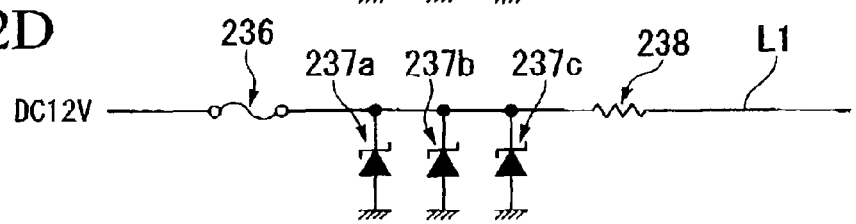

As shown in FIG. 12D, a fuse 236, three zener diodes 237a, 237b, 237c, and a resistance 238 are inserted in a line for supplying power to the motor drive board 72 in the control unit 3 (line L1 shown in FIG. 5) so as to limit direct-current energy.

Figure 12E:
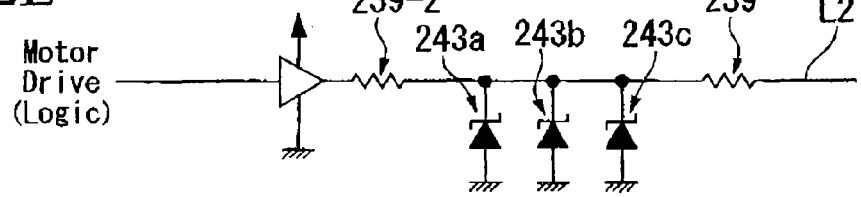

As shown in FIG. 12E, a high resistance 239, three zener diodes 243a, 243b, 243c, and a resistance 239-2 for limiting current in normal rating of the high resistance 239 are inserted in a signal line for turning on/off the motor and various switches in the control unit 3 (line L2 shown in FIG. 5) so as to limit the direct-current energy.

Also, the fuse used for the energy-limiting circuit in the barrier circuit 64 is a barrier network fuse having guaranteed pre-arcing performance. For example, a fuse conforming to Barrier Network Standards EN50020 may be preferably to be used.

As explained above, in the first embodiment of the present invention, as shown in FIG. 5, the barrier circuit 64 for limiting signals and power supply energy to each circuit is disposed in the scope connector 5. Thus, the requirement of explosion-proof construction is satisfied. That is, in the first embodiment of the present invention, even if a short circuit occurs, sparks are not produced because the barrier circuit 64 limits signal and power supply energy to each circuit. Accordingly, explosion-proof construction is realized by eliminating a ignition source as one of the factors that cause explosions.

In addition, in the first embodiment of the present invention, the explosion-proof construction is realized in the scope unit 2 by satisfying the standard with respect to the ia apparatus.

Furthermore, in the first embodiment of the present invention, as shown in FIG. 5, the barrier circuit 64 for limiting signals and power supply energy to each circuit is disposed in the scope connector 5. Thus, the requirement of explosion-proof construction is satisfied. As far as the barrier circuit 64 shown in FIGS. 11A to 12E is concerned, three zener diodes and a resistance are disposed in order to limit direct current energy, and three coupling condensers are disposed in order to limit alternating current energy. This is because the energy can be limited by one of three zener diodes and coupling condensers even if two them are broken. Therefore, the standard with respect to the ia apparatus can be satisfied. Using two diodes may also be preferable as long as the standard with respect to the ib apparatus is satisfied.

Basically, the energy-limiting circuit included in the barrier circuit 64 is formed by combining structures shown in FIGS. 13A to 14D, and the current-limiting circuit in the barrier circuit 64 shown in FIGS. 11A to 12E is based on these combinations.

Figure 13A:
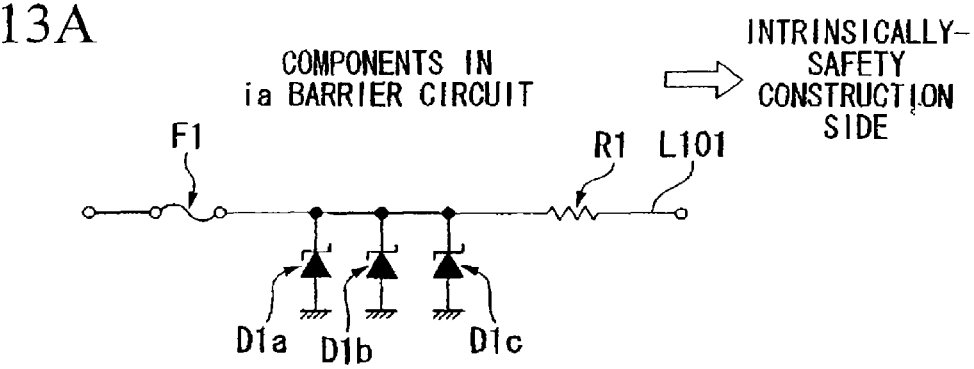
FIGS. 13A to 13D are connection diagrams used for explaining an energy-limiting circuit.

FIGS. 13A to 13D show examples of energy-limiting circuits satisfying the standard with respect to the ia apparatus. FIG. 13A shows an energy-limiting circuit operable with direct-current. As shown in FIG. 13A, the energy-limiting circuit operable with direct current includes a fuse F1 and a resistance R1 in a line L101. Furthermore, three zener diodes D1a, D1b, D1c are disposed between the line L101 and ground. By disposing the three zener diodes D1a, D1b, D1c in this manner, the voltage in the line L101 does not increase. In addition, the three zener diodes D1a, D1b, D1c are disposed because the standard of the ia apparatus as an explosion-protection apparatus must be satisfied even if two of the zener diodes D1a, D1b, D1c are broken. Thus, reliability can be obtained.

Figure 13B:

FIG. 13B shows an energy-limiting circuit operable with alternating current. As shown in FIG. 13B, the energy-limiting circuit operable with alternating current includes three coupling condensers C1a, C1b, C1c in a line L102. By disposing the coupling condensers C1a, C1b, C1c in this manner, the energy is limited by blocking the current directly in the circuit. In addition, the three zener diodes C1a, C1b, C1c are disposed because the standard of the ia apparatus as an explosion-protection apparatus must be satisfied even if two of the condensers C1a, C1b, C1c are broken; thus, reliability can be obtained. Condensers C1a, C1b, C1c should be selected having values configured so that waveforms do not deform when they are AC-coupled. The A/C coupling condenser, i.e., a high voltage ceramic condenser, must have 500V of minimum withstand voltage.

Figure 13C:
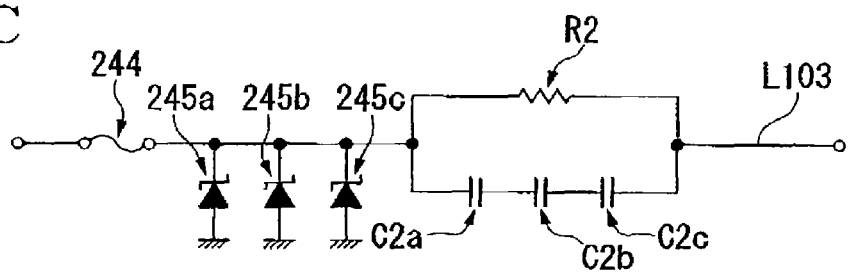

FIG. 13C shows an energy-limiting circuit where an alternating current component is included in direct bias. In this state as shown in FIG. 13C, a resistance R2 and three coupling condensers C6a, C2b, C2c are connected in parallel and inserted in the line L103. In this state, the energy of direct current is limited by a fuse 244 and the three zener diodes 245a, 245b, 245c and a resistance R2. The energy of alternating current is limited by the coupling condensers C1a, C1b, C1c.

Figure 13D:
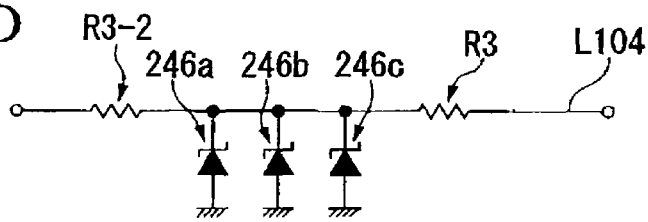

FIG. 13D shows an energy-limiting circuit corresponding to a logic signal (signal indicated by H-level and L-level). As shown in FIG. 13D, the energy is limited by inserting a resistance R3 in a line L104. Furthermore, three zener diodes 246a, 246b, 246c and a resistance R3-2 are inserted for limiting electric current to which a normal value current with respect to the resistance R3. For example, a selected resistance value of the resistance R3 may be from 1 kΩ to 10 kΩ as long as a normal logic voltage of signal is of +5V to +3V.

Figure 14A:
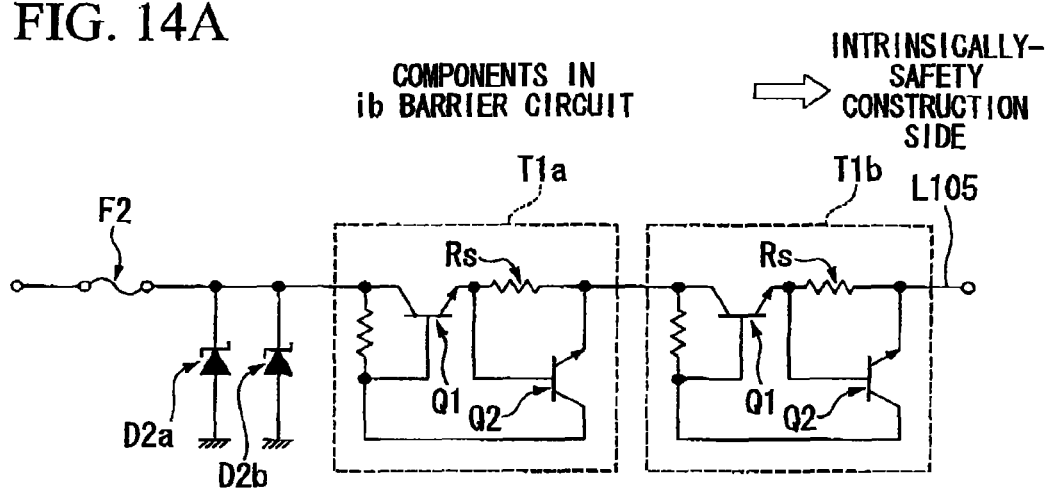
FIGS. 14A to 14D are also connection diagrams used for explaining the energy-limiting circuit.

FIGS. 14A to 14D show examples of energy-limiting circuits satisfying the standard with respect to the ib apparatus. FIG. 14A shows an energy-limiting circuit operable with direct-current. As shown in FIG. 14A, current-limiting circuits T1a, T1b, including a fuse F2 and two transistors Q1, Q2 in a line L105, are disposed in the energy-limiting circuit operable with direct current. Furthermore, two zener diodes D2a, D2b are disposed between the line L105 and ground. In addition, two current-regulating circuits T1a T1b are disposed because the standard of the ib apparatus as an explosion-protection apparatuses must be satisfied even if one of the current-limiting circuits T1a, T1b is broken; thus, reliability can be obtained. In addition, two zener diodes D2a, D2b are disposed because the standard of the ib apparatus as an explosion-protection apparatuses must be satisfied even if the one of the zener diodes D2a, D2 is broken. Thus, reliability can be obtained.

By disposing the two zener diodes D2a, D2b in this manner, the voltage in the line L105 does not increase.

Furthermore, by doing this, the electric current is shut off by the current-limiting circuits T1a, T1b when the electric current is excessive. That is, if an electric current flowing in the line L105 is significant in the current-limiting circuits T1a, T1b, voltage between both ends of a resistance Rs increases, and a transistor Q2 is turned on when the voltage exceeds the VBE of transistor Q2. As a result, the transistor Q1 is turned off, and the electric current flowing in the line L105 is shut off accordingly. The rated capacity in the fuse F2 is configured so as not to exceed the rated capacity of the two zener diodes and two transistors. Although transistors are used in a circuit shown in FIG. 14A, any semiconductor, for example, an FET (field effect transistor) having similar function may be used.

Figure 14B:
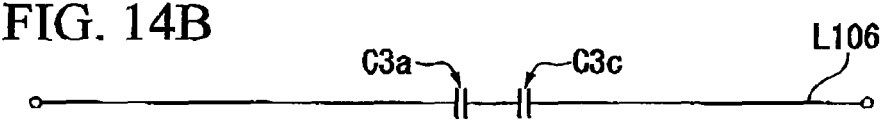

FIG. 14B shows an energy-limiting circuit operable with alternating current. As shown in FIG. 14B, the energy-limiting circuit operable with alternating current includes two coupling condensers C3a, C3b in a line L106. By disposing the coupling condensers C3a, C3b in this manner, the energy is limited by blocking the current directly in the circuit. In addition, two coupling condensers C3a, C3b are disposed because the standard of the ib apparatus as an explosion-protection apparatus must be satisfied even if one of condensers C3a, C3b is broken. Thus, reliability can be reserved.

Figure 14C:
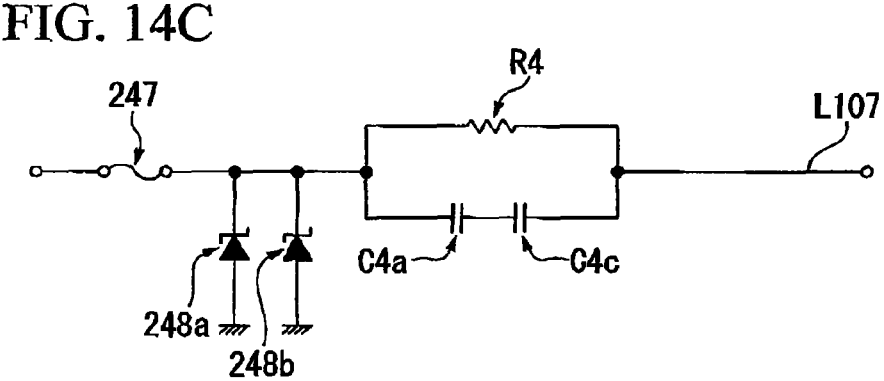

FIG. 14C shows an energy-limiting circuit where an alternating current component is included in direct bias. In this state as shown in FIG. 14C, a resistance R4 and two coupling condensers D2a, D2b are connected in parallel and inserted in the line L107. In this state, the energy of the direct current is limited by a fuse 247 and the two zener diodes 248a, 248b and the resistance R4. The energy of alternating current is limited by the coupling condensers C4a, C4b.

Figure 14D:
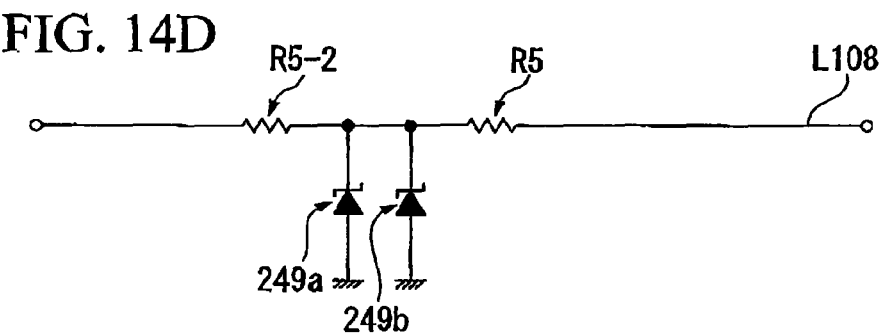

FIG. 14D shows an energy-limiting circuit corresponding to a logic signal (signal indicated by H-level and L-level). As shown in FIG. 14D, a resistance R5 and two zener diodes 249a, 249b, and a resistance R5-2 are inserted in a line L108 for limiting electric current to within a normal current value with respect to the resistance R5. Furthermore, elements (resistance R4 and resistance R5) shown in FIGS. 14A to 14D for limiting direct-current energy can be replaced by limiting components, for example, two transistors such as the current-limiting circuits T1a and T1b. In this case, although the number of parts increases and implementation area increases by using two transistors, there is a merit in that the voltage for circuits driving the explosion-proof construction section can be decreased due to fallout of the potential caused by the resistances R4, R5 in normal operation.

The first embodiment of the present invention is configured so that the barrier circuit 64 is disposed in the scope connector 5 as explained above. The portion extending from the barrier circuit 64 toward a tip is of explosion-proof construction accordingly. In this example, the control unit 3, the insertion portion 4, and the optical adaptor 8 are of explosion-proof construction. Thus, these can be used in an explosive location. Accordingly, it is possible to inspect the inside of jet engines, factories, and gasoline tanks reliably and infallibly.

Furthermore, since the barrier circuit 64 is disposed in the scope connector 5 in the first embodiment of the present invention, the portion extending from the barrier circuit 64 toward the tip thereof is of explosion-proof construction, i.e., the control unit 3, the insertion portion 4, and the optical adaptor 8 are of explosion-proof construction. The user must recognize which units forming the endoscope apparatus are of explosion-proof construction.

Also, the user can be warned against the inadvertent introduction of non-explosion-proof construction into the hazardous areas precautiously if the user can acknowledge that the border between the explosion-proof construction and the non-explosion-proof construction is close to a hazardous area reliably. Therefore, in the first embodiment of the present invention, colored markings are added so as to identify the explosion-proof construction from non-explosion-proof construction instantly. Furthermore, the colored markings indicate that non-explosion-proof construction is quite to the explosive area.

Figure 15:
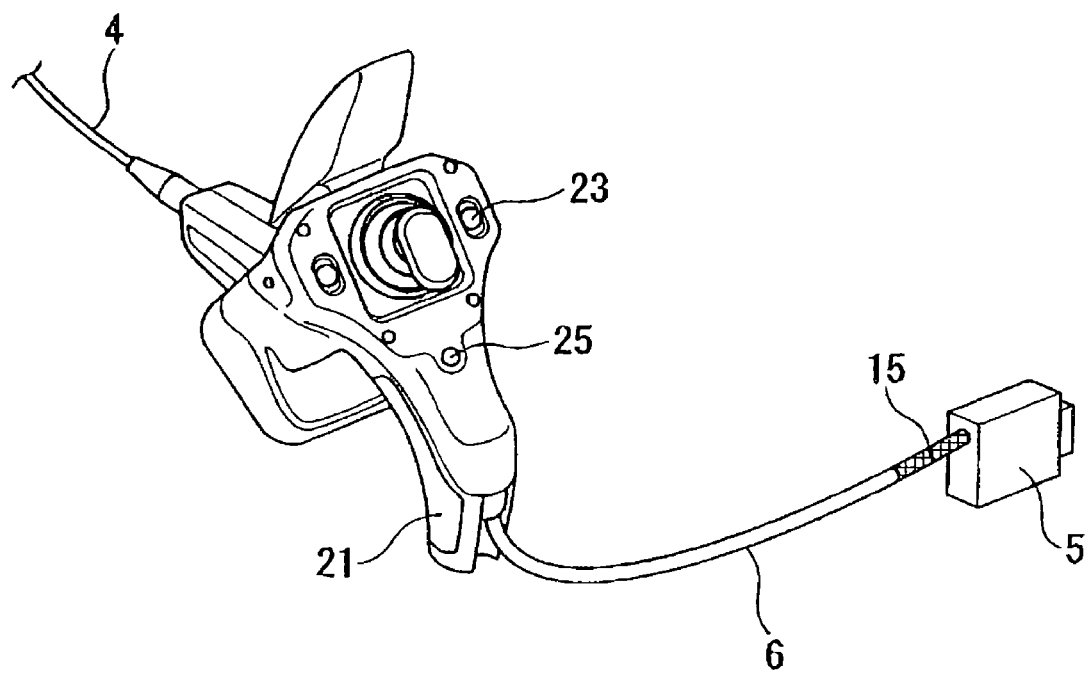
FIG. 15 is a perspective view used for explaining an identification section having an explosion-proof construction.

That is, in the case of the first embodiment of the present invention, the barrier circuit 64 is disposed in the scope connector 5. Thus, and the control unit 3, the insertion portion 4, and the optical adaptor g are of the explosion-proof construction. In this case, as shown in FIG. 15, a colored section 15 is disposed in the universal cable 6 connecting the scope connector 5 to the control unit 3 so as to indicate that the portion extending from the colored section 15 toward the main unit 1 is not of the explosion-proof construction. By doing this, the user can be aware that the portion between the colored section 15 and the main unit 1 is not of the explosion-proof construction. Furthermore, in this example, although the colored section 15 is disposed at a predetermined distance from the scope connector 5 in the universal cable 6 so that the colored marking indicates that there is only a small portion of uninserted explosion-proof construction, different colors may be used for the portion of the explosion-proof construction and the portion of non-explosion-proof construction. In addition, the colored section 15 may be more noticeable to the user if it has a fluorescent color or a light blue.

Also, in the first embodiment of the present invention, a coating material is applied to a chip component in the circuit disposed on the barrier circuit 64. That is, as shown in FIG. 16, a chip component 17 is disposed in a pattern 20 on a substrate 16 using a soldering method. A coating material 18 is applied to this circuit substrate. The coating material 18 used here may be a silicon-coating material. By applying such a coating material, it is possible to realize a required insulation distance regulated by IEC 60079-11. That is, a clearance distance La between patterns in FIG. 16 having 30 V of withstand voltage and without the coating material is 2.0 mm. In contrast, if the coating material 18 is applied, 0.7 mm may be desirable. If 0.7 mm of the creepage distance is desirable, resistances for forming the energy-limiting circuit, for example, A/C coupling condensers and semiconductors may be small chip components, for example, chip components having a size of 3216.

Furthermore, a thermistor 34 is disposed at the tip of the insertion portion 4 in the first embodiment of the present invention. Warnings may be emitted with respect to the possibility of explosion by using temperature output detected by this thermistor 34 if the peripheral temperature is higher than a predetermined value. The temperature in an object section concerning the explosion-proof construction must be a tolerable temperature or lower than that of an object gas or dust in view of a defect mode. Therefore, the relationship indicated below must be satisfied.

(Environmental Temperature)+(Increase in Temperature during Defect)<(Ignition Temperature Value)

For example, the increase in temperature during a defect must be restricted to approximately 100° C. if the environmental temperature when used is 100° C. in view of that an ignition temperature of n hexane is approximately 220° C. if the n hexane, which is an object gas determining the ignition temperature, is used as a fuel for jet engines. That is, a relationship below must be satisfied.

(Environmental Temperature+100° C.)+(Increase in Temperature 100° C. during Defect)<(Ignition Temperature Value: 220° C.)

Figure 35:
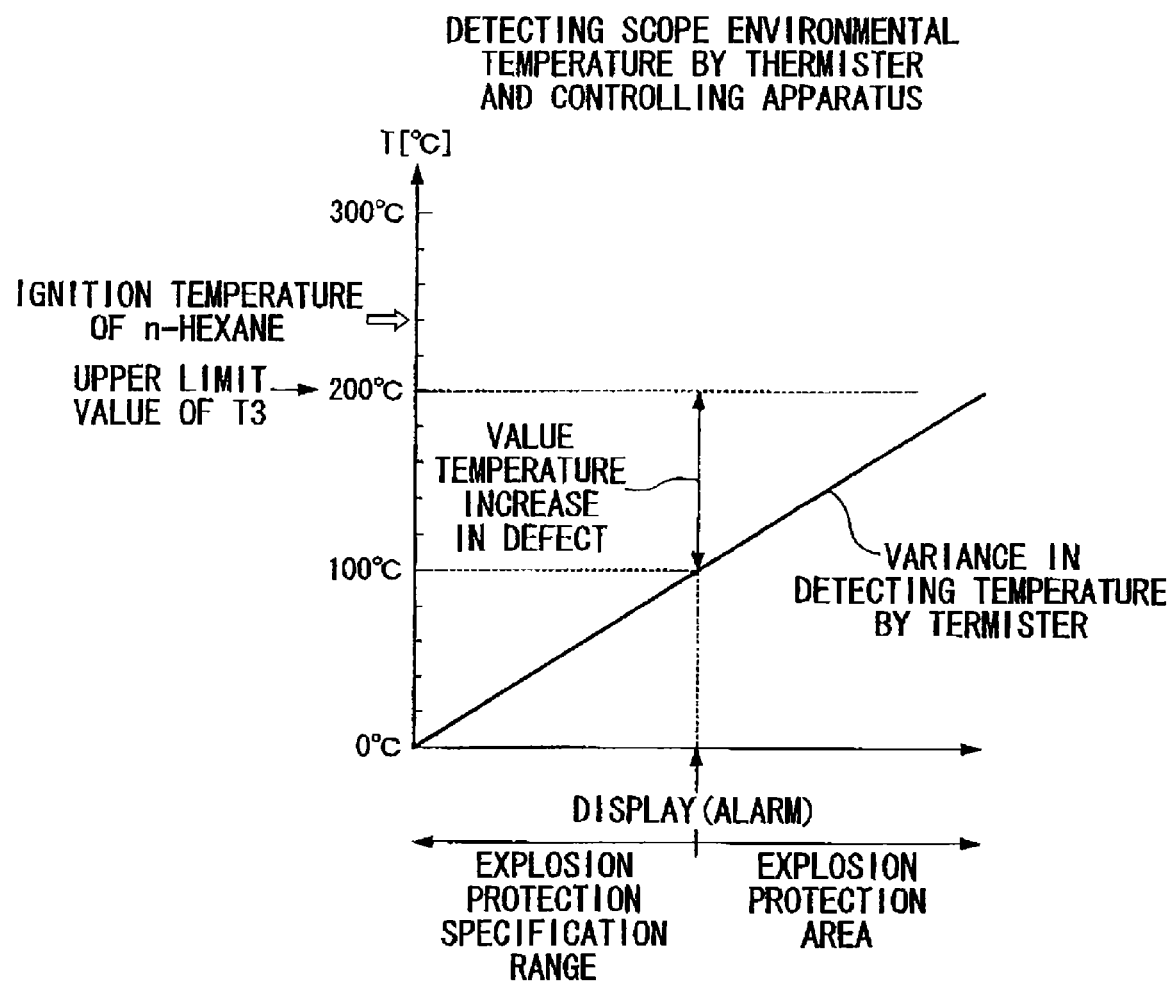
FIG. 35 is a graph with respect to how an alarm is displayed by an alarming unit measuring an environmental temperature of scope using the thermistor.

The ranking of the temperature applied the object gas used in the intrinsically-safe-construction apparatus based on the regulation of IEC60079 is determined by the ignition temperature. A gas having 200° C. or lower ignition temperature is called a T3 in the ranking. In FIG. 35, the environmental temperature and the increase in temperature must be restricted to the limit of T3, i.e., 200° C. In order to realize explosion-protection apparatuses directed to the ignition temperature of T3, the environmental temperature for satisfying the explosion safety requirement must be 100° C. or lower if the increase in temperature caused by the energy limited by the barrier circuit during defect is 100° C. In the case of FIG. 35, if an ambient temperature is 100° C. or lower, the explosion-protection can be obtained, however, if the temperature is higher than 100° C., explosion-protection cannot be obtained.

As shown in FIG. 35, if the temperature measured by the thermistor 34 exceeds 100° C. (threshold), a warning is displayed on an LCD monitor 12 or a warning sound is sounded by a warning section. By doing this, it is possible to notify the user that the temperature around the tip of the insertion portion 4 exceeds the predetermined temperature. Thus, it is possible to alert of the user. The warning section is not limited to using a display and sound, for example, vibration, or a blinking light, may be used. The threshold is not limited to 100° C., i.e., the threshold may be changed variably.

(2) Second Embodiment

Figure 17:
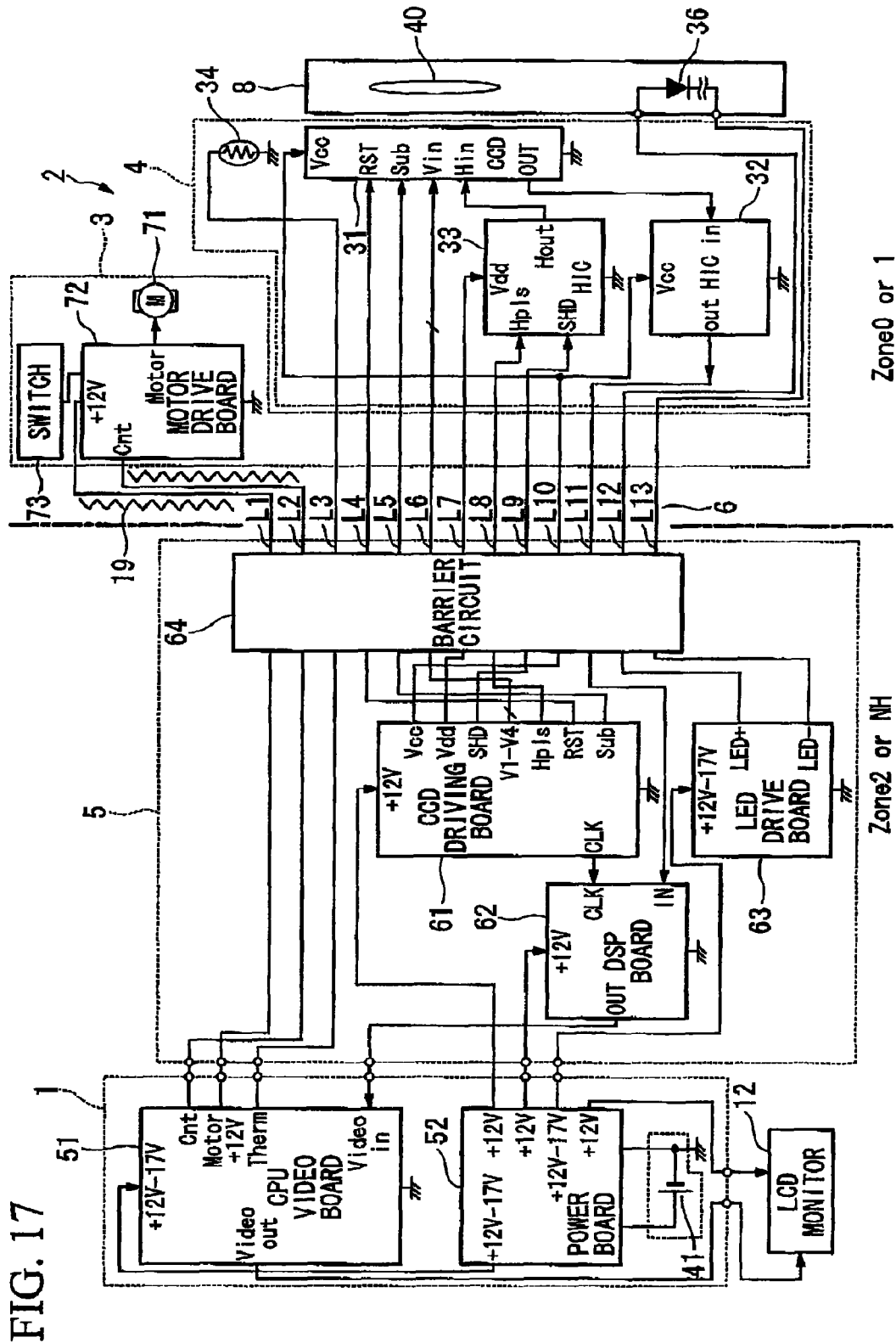
FIG. 17 is a block diagram showing the inner structure of a second embodiment of the present invention.

Next, a second embodiment of the present invention will be explained. FIG. 17 shows a second embodiment of the present invention. In the present embodiment, similar to the first embodiment, the barrier circuit 64 is disposed in the scope connector 5, and the portion extending from the barrier circuit 64, i.e., the control unit 3, the insertion portion 4, and the optical adaptor 8 are of explosion-proof construction. In this second embodiment, the signal line extending to the tip of the scope unit 2 is insulated from the other signal lines in the configuration of the first embodiment by an insulating member 19 so as to divide the energy. The thickness of the insulating member used here may be 0.5 mm or thicker; thus it is possible to divide the energy reliably. More importantly, the same effect can be obtained by applying the insulating member to the signal line extending toward the tip of the scope unit 2. The rest of the components are the same as those explained with respect to the first embodiment, and the same reference symbols are added correspondingly. Thus, the explanations thereof will be omitted.

(3) Third Embodiment

Figure 18:
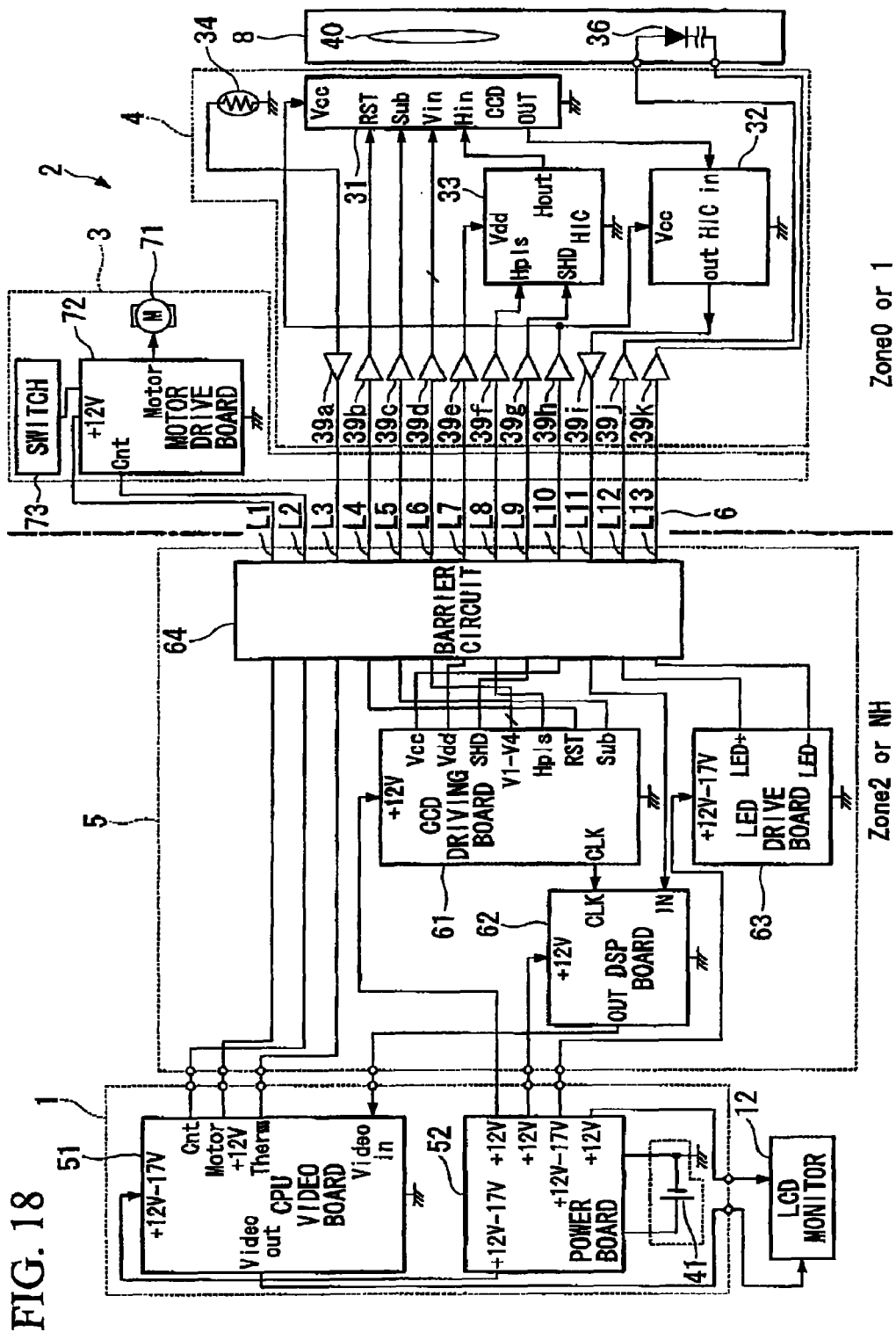
FIG. 18 is a block diagram showing the inner structure of a third embodiment of the present invention.

FIG. 18 shows a third embodiment of the present invention. In the present embodiment, similar to the first embodiment, the barrier circuit 64 is disposed in the scope connector 5, and the portion extending from the barrier circuit 64, i.e., the control unit 3, the insertion portion 4, and the optical adaptor 8 are of explosion-proof construction. In this third embodiment, buffers 39a to 39k are inserted in a path in the insertion portion 4. In the present embodiment, similar to the first embodiment, the control unit 3, the insertion portion 4, and the optical adaptor 8 are of explosion-proof construction. In the present embodiment, since the buffers 39a to 39k are inserted in the path of the insertion portion 4, a required signal level can be obtained and it is possible to improve S/N ratio even if the length of the insertion portion 4 is significant.

(4) Fourth Embodiment

Figure 19:
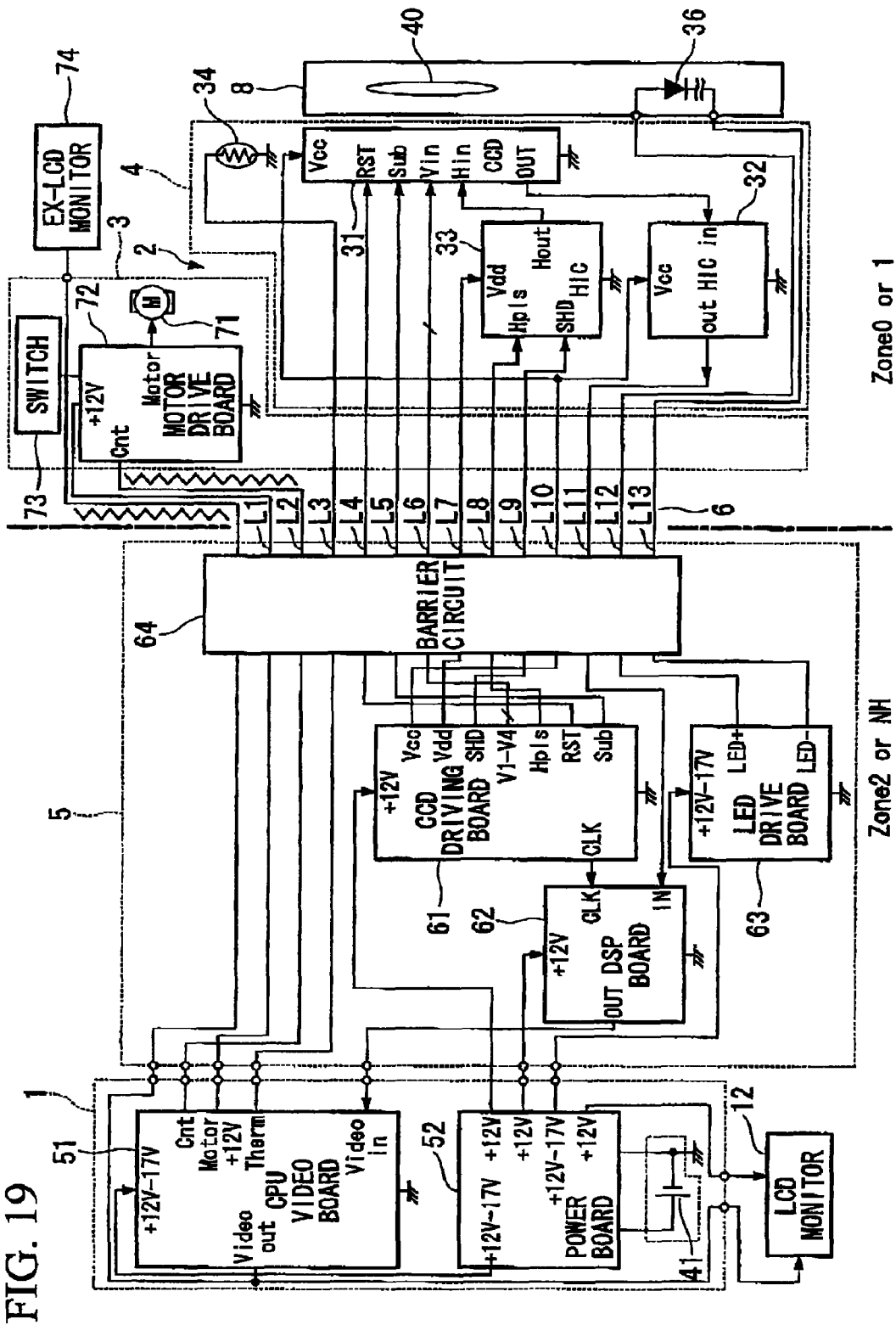
FIG. 19 is a block diagram showing the inner structure of a fourth embodiment of the present invention.

FIG. 19 shows a fourth embodiment of the present invention. In the present embodiment, similar to the first embodiment, the barrier circuit 64 is disposed in the scope connector 5, and the portion extending from the barrier circuit 64, i.e., the control unit 3, the insertion portion 4, and the optical adaptor 8 are of explosion-proof construction. In this fourth embodiment, an LCD monitor 74 is disposed on the control unit 3. By doing this, the user can conduct a monitoring-operation while observing the LCD monitor 74 of the control unit 3.

Furthermore, in the present embodiment, since the control unit 3 is of explosion-proof construction, the LCD monitor 74 prepared must be also of explosion-proof construction.

That is, the LCD monitor which can be used here may be an LCD monitor having a backlight using a cold cathode ray tube, and an LCD monitor having a backlight using an LCD.

Figure 20:
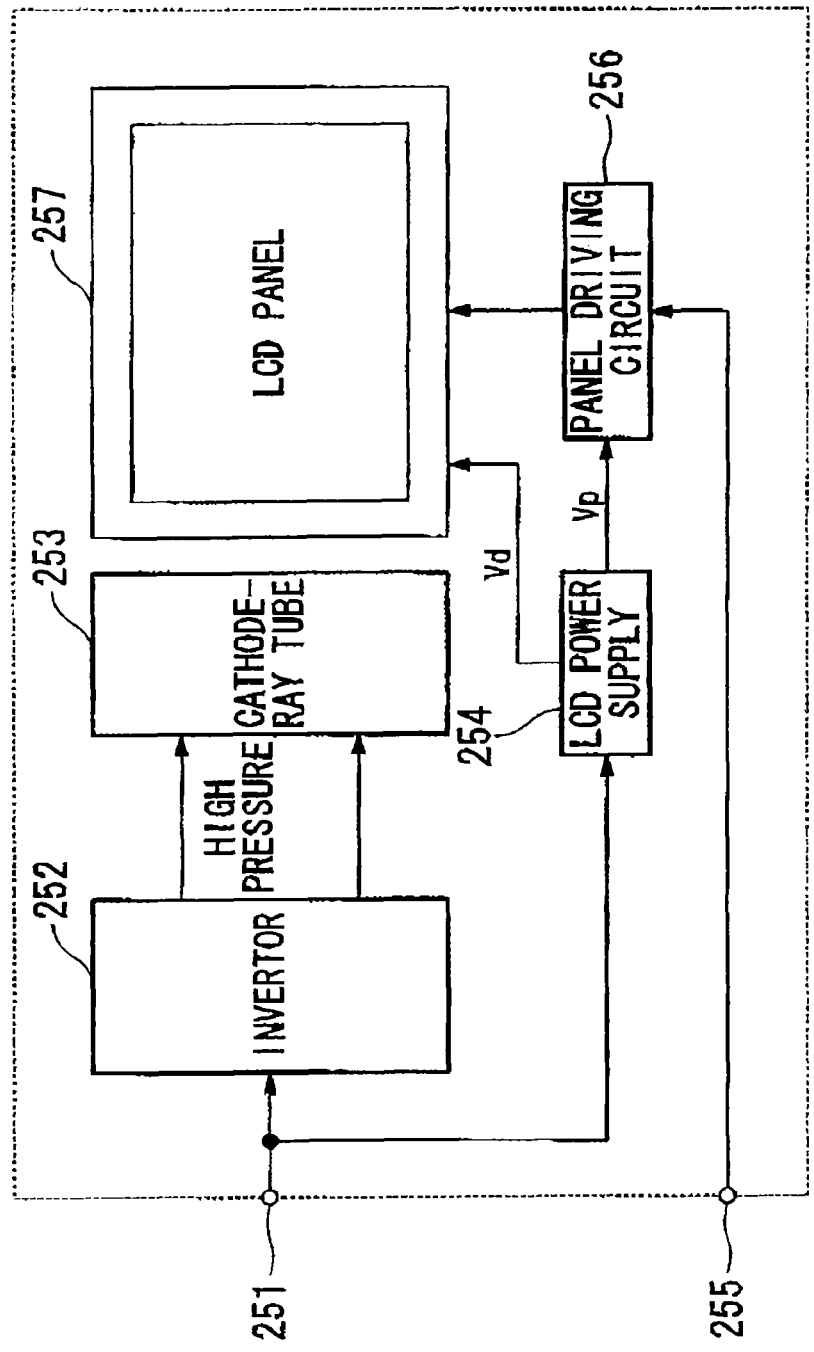
FIG. 20 is a block diagram used for explaining an LCD monitor using a cathode-ray tube.

FIG. 20 shows an example of the LCD monitor having a backlight using an LED. In FIG. 20, a power supply applied to a power-supplying terminal 251 is converted to a power supply having a high voltage by an inverter 252 and supplied to a cathode-ray tube 253 used as a backlight. By doing this, the cathode-ray tube 253 is turned on. In addition, the inverter 252 generates a voltage having 2 kV when the light is turned on and a voltage 600 V during normal operation. Also, the power supply from the power-supplying terminal 251 is supplied to an LCD power-supplying circuit 254, and a power supply used for driving a panel is provided in the LCD power-supplying circuit 254. A video signal from an input terminal 255 is supplied to the panel-driving circuit 256, and the LCD panel 257 is driven by the panel-driving circuit 256. By doing this, images are displayed on the LCD panel 257.

Figure 21:
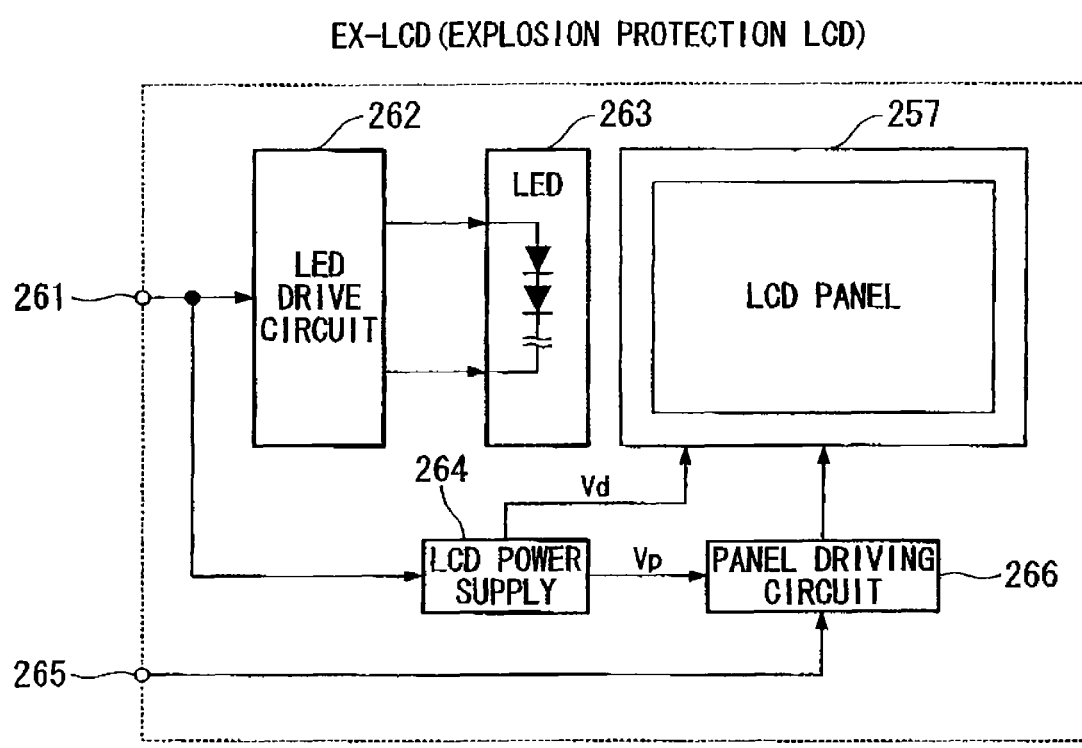
FIG. 21 is a block diagram used for explaining an LCD monitor using an LCD.

FIG. 21 shows an example for the LCD monitor having a backlight using an LED. In FIG. 21, a power supply applied to the power-supplying terminal 261 is supplied to a LCD power-supplying circuit 264 and to an LCD power-supplying circuit 264. The LED drive circuit 262 drives the LED backlight 263 by a low voltage, for example, 20 V or lower. The LED backlight 263 is driven by a LED drive circuit 262. Also, a power supply for driving the panel is formed by the LCD power-supplying circuit 264. A video signal from an input terminal 265 is supplied to the panel-driving circuit 266, and the LCD panel 267 is driven by the panel-driving circuit 266. By doing this, images are displayed on the LCD panel 267.

With respect to the LCD monitor 12 disposed in the main unit 1, since the main unit 1 is not of explosion-proof construction, the LCD monitor 12 may use a backlight using a cold cathode ray tube as shown in FIG. 20 or a backlight using the LED as shown in FIG. 21 compatibly.

However, since the control unit 3 is of explosion-proof construction, the LCD monitor 74 disposed in the control unit 3 must be of explosion-proof construction accordingly. Since high voltage is applied to the cathode-ray tube 253 used for the backlight shown in FIG. 20, it is not suitable for the explosion-proof construction. The LCD monitor 74 disposed in the control unit 3 must use a backlight using an LED as shown in FIG. 21. More specifically, if the main unit 1 is a Type-n apparatus used in Zone 2, the LCD monitor may not be of explosion-proof construction categorized in the ia apparatus or ib apparatus, i.e., it may be a Type-n LCD monitor corresponding to Zone 2.

(5) Fifth Embodiment

Figure 22:
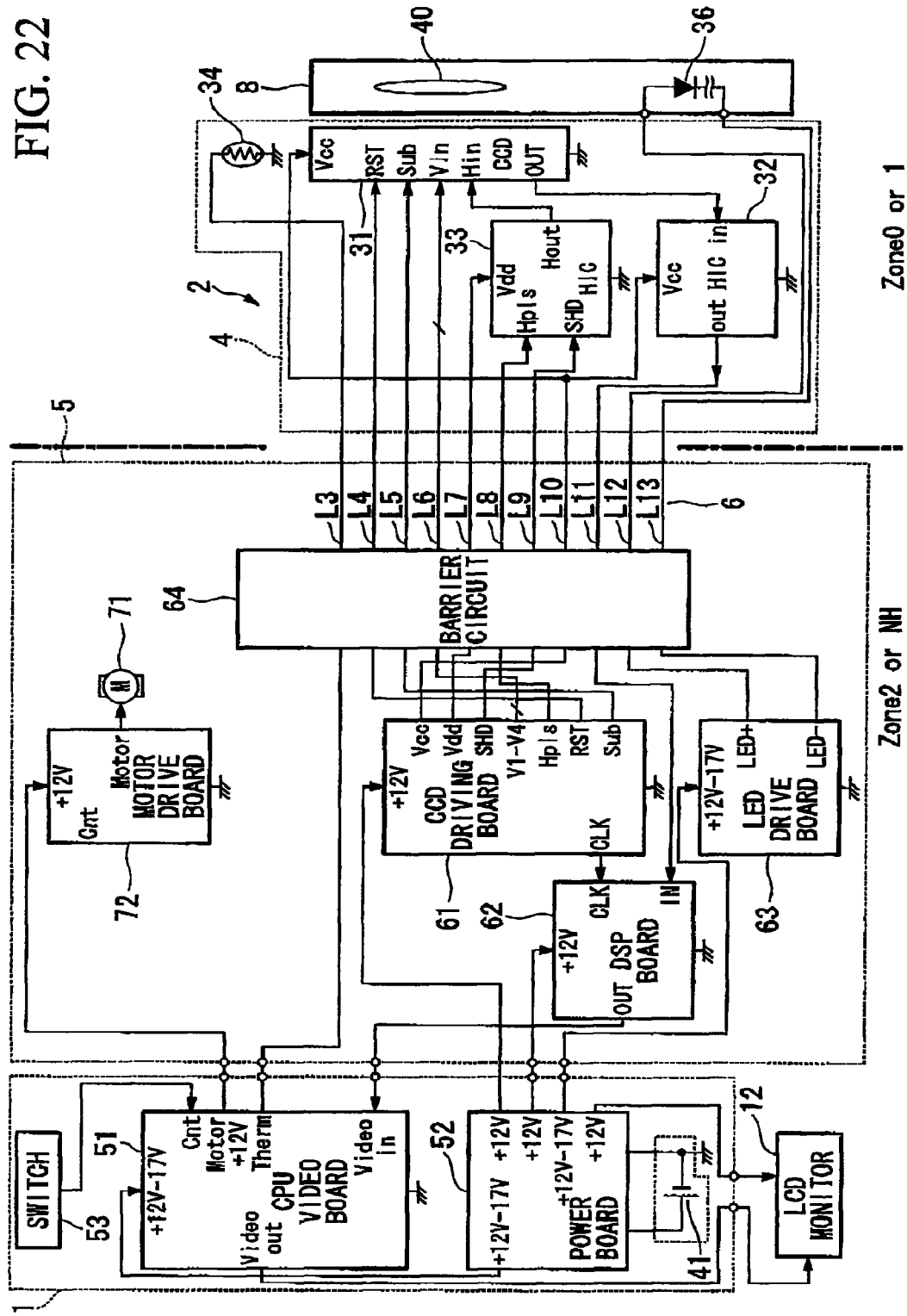
FIG. 22 is a block diagram showing the inner structure of a fifth embodiment of the present invention.

FIG. 22 shows a fifth embodiment of the present invention. This embodiment is an example applied to the scope unit 2 not having a control unit. That is, in the previous embodiments, the scope unit 2 is formed by the control unit 3, the insertion portion 4, and the optical adaptor 8 so that various operations can be conducted by the control unit 3.

In contrast, in the present embodiment, the insertion portion 4 extends from the main unit 1 through the scope connector 5, and all the operations are conducted from the main unit 1. In addition, a switch 53 for conducting various operations is disposed in the main unit 1.

Also, a motor 71 for manipulating a bending portion 9 of the tip of the insertion portion 4 and a motor-driving board 72 are disposed in a scope connector 5.

In the present embodiment, similar to the first embodiment, the barrier circuit 64 is disposed in the scope connector 5. Therefore, a portion extending toward the tip from the barrier circuit 64, i.e., the insertion portion 4 and the optical adaptor 8 are of explosion-proof construction.

(6) Sixth Embodiment

Figure 23:
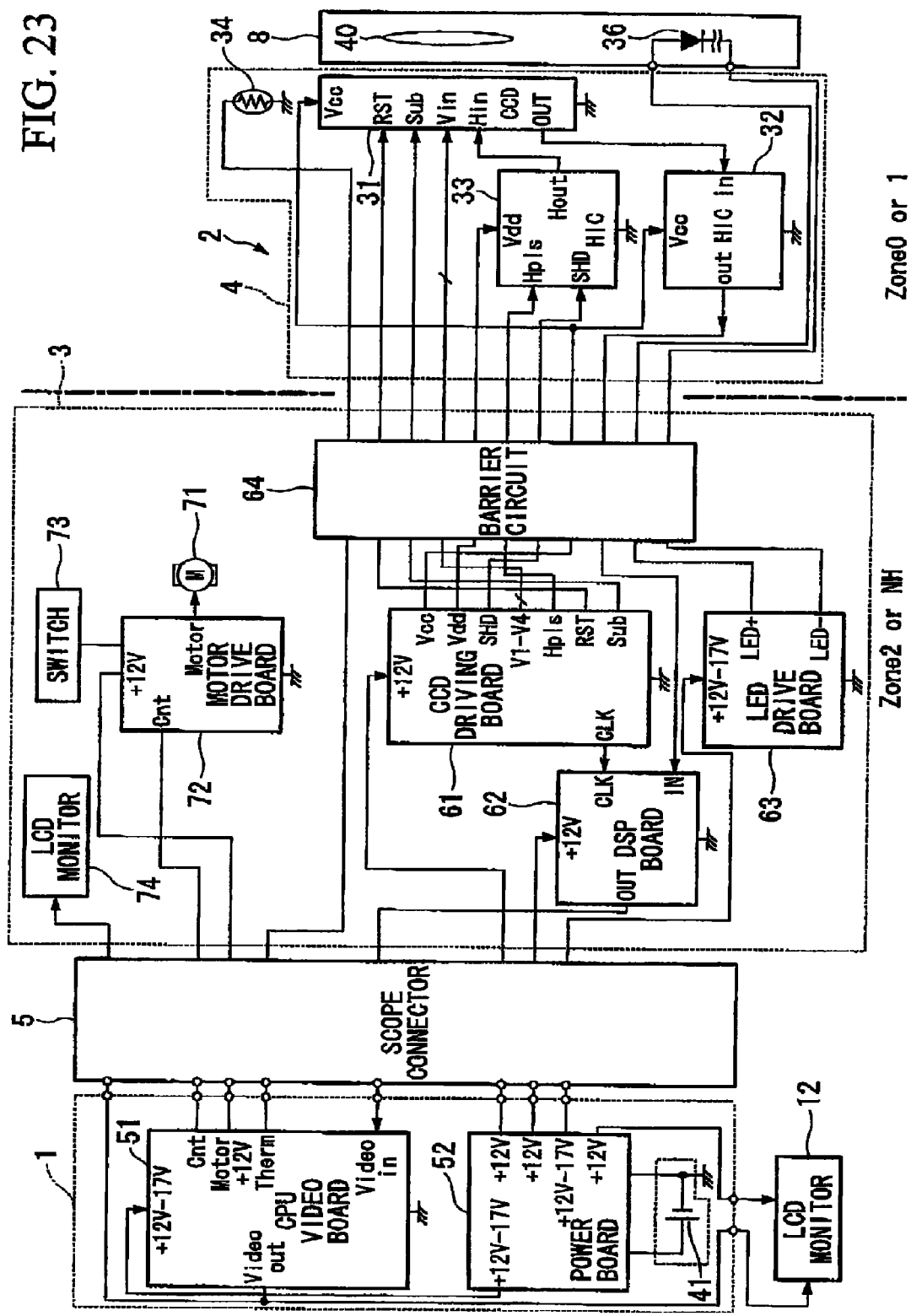
FIG. 23 is a block diagram showing the inner structure of a sixth embodiment of the present invention.

FIG. 23 shows a sixth embodiment of the present invention. In the previous first to fifth embodiments, the barrier circuit 64 is disposed in the scope connector 5. In contrast, in the present embodiment, the barrier circuit 64 is disposed in the control unit 3.

In the first embodiment, a CCD drive board 61, a DSP board 62, and an LED drive board 63 are disposed in the scope connector 5. In contrast, in the sixth embodiment, the CCD drive board 61, the DSP board 62, and an LED drive board 63 are disposed in the control unit 3. In addition, the barrier circuit 64 is disposed posterior thereto.

Since the portion extending from the barrier circuit 64 is of explosion-proof construction, the insertion portion 4 and the optical adaptor 8 are of explosion-proof construction in the sixth embodiment. In the first embodiment, the control unit 3, the insertion portion 4, and the optical adaptor 8 are of explosion-proof construction, and in contrast, in the present embodiment, the control unit 3 is not of explosion-proof construction. However, in the present embodiment, the scope connector 5 may be a connector merely connecting the main unit 1 to the scope unit 2; therefore, the structure can be simplified. Furthermore, an LCD may be attached to the control unit.

(7) Seventh Embodiment

Figure 24:
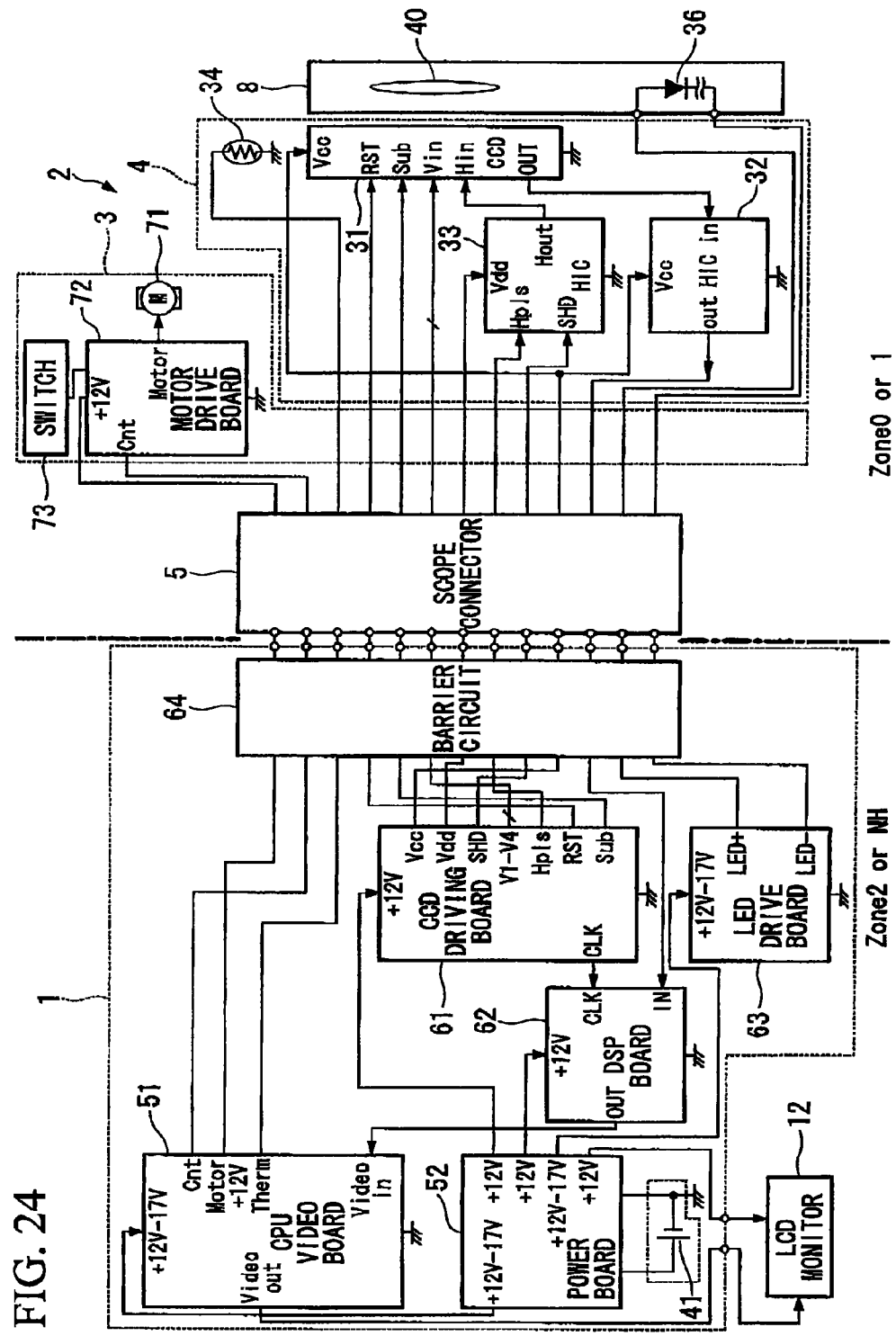
FIG. 24 is a block diagram showing the inner structure of a seventh embodiment of the present invention.

FIG. 24 shows a seventh embodiment of the present invention. In the previous first to fifth embodiments, the barrier circuit 64 is disposed in the scope connector 5. Also, the barrier circuit 64 is disposed in the control unit 3 in the sixth embodiment. In contrast, in the present embodiment, the barrier circuit 64 is disposed in the main unit 1.

In the first embodiment, the CCD drive board 61, the DSP board 62, and the LED drive board 63 are disposed in the scope connector 5. In contrast, in the seventh embodiment, the CCD drive board 61, the DSP board 62, and an LED drive board 63 are disposed in the main unit 1. In addition, the barrier circuit 64 is disposed posterior thereto.

Since the portion extending from the barrier circuit 64 is of explosion-proof construction, the scope connector 5, the control unit 3, the insertion portion 4, and the optical adaptor 8 are of explosion-proof construction in the seventh embodiment. Furthermore, a motor may be disposed in the scope connector, and in addition, an EX-LCD (explosion protection LCD) may be attachable to the control unit.

(8) Eighth Embodiment

Figure 25:
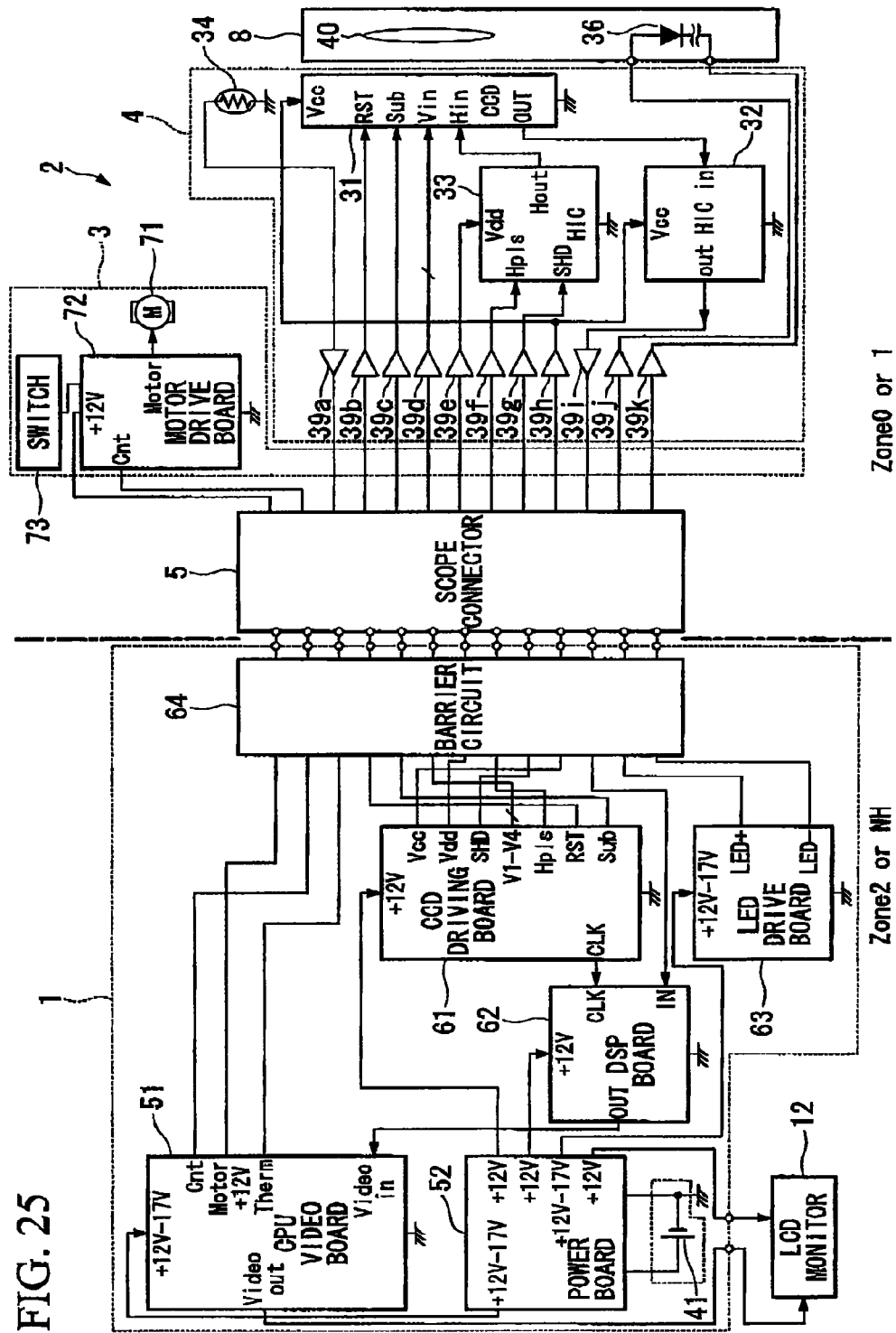
FIG. 25 is a block diagram showing an inner structure of an eighth embodiment of the present invention.

FIG. 25 shows an eighth embodiment of the present invention. In the present embodiment, similar to the seventh embodiment, the barrier circuit 64 is disposed in the main unit 1, and the portion extending from the barrier circuit 64, i.e., the scope connector 5, the control unit 3, the insertion portion 4, and the optical adaptor 8 are of explosion-proof construction. In the eighth embodiment, buffers 39a to 39k are inserted in a path in the insertion portion 4. In this embodiment, since the buffers 39a to 39k are inserted in the path of the insertion portion 4, required signal level can be obtained and it is possible to improve S/N ratio even if the length of the insertion portion 4 is significant.

(9) Ninth Embodiment

Figure 26:
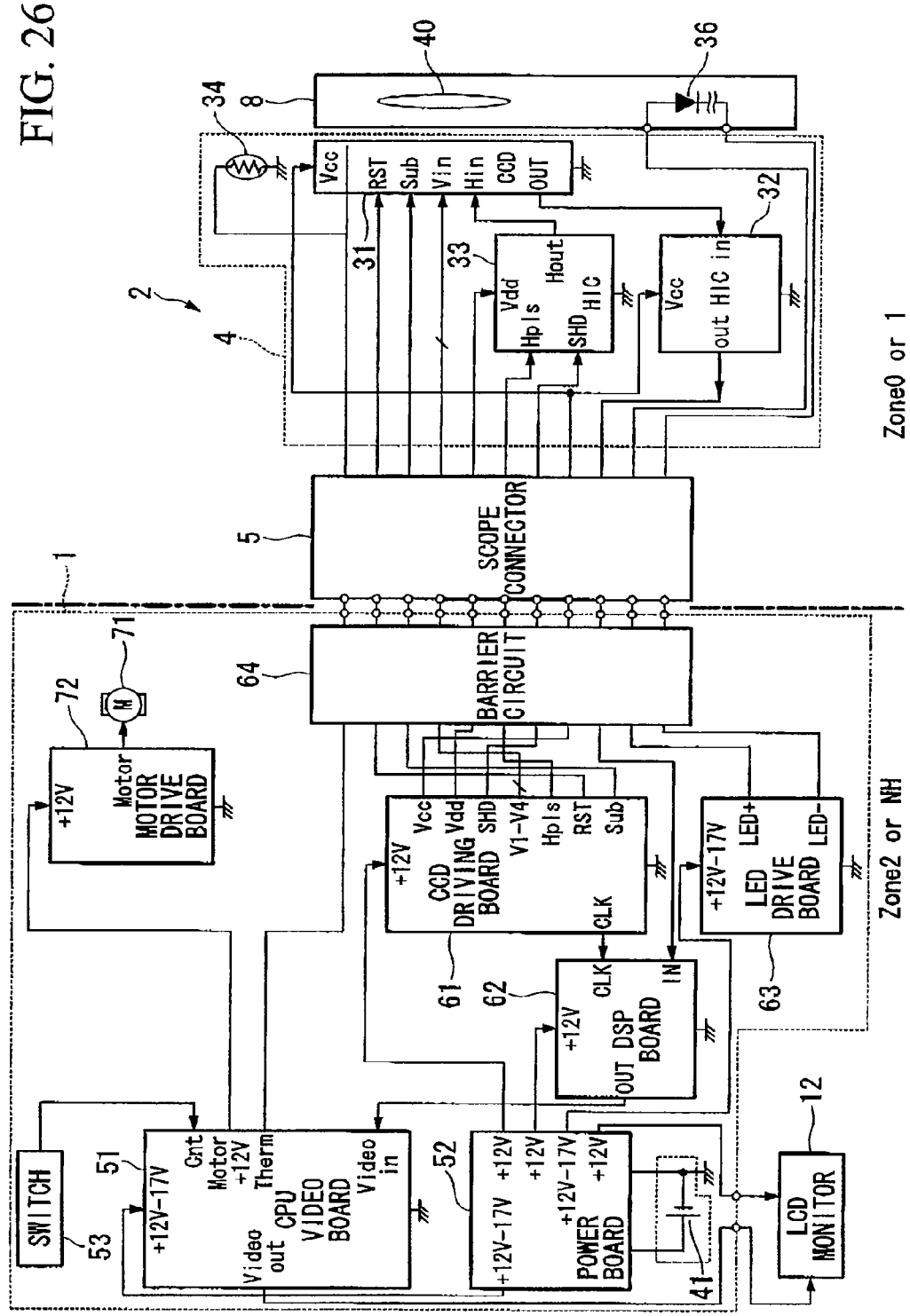
FIG. 26 is a block diagram showing the inner structure of a ninth embodiment of the present invention.

FIG. 26 shows a ninth embodiment of the present invention. This embodiment is an example applied to the scope unit 2 not having a control unit. In the present embodiment the insertion portion 4 extends from the main unit 1 through the scope connector 5, and all the operations are conducted from the main unit 1. In addition, the switch 53 for conducting various operations is disposed in the main unit 1. Also, the motor 71 for manipulating the bending portion 9 of the tip of the insertion portion 4 and the motor-driving board 72 are disposed in the main unit 1.

In the present embodiment, similar to the seventh embodiment, the barrier circuit 64 is disposed in the main unit 1. Therefore, a portion extending toward the tip from the barrier circuit 64, i.e., the scope connector 5, the insertion portion 4, and the optical adaptor 8 are of explosion-proof construction.

(10) Tenth Embodiment

Figure 27:
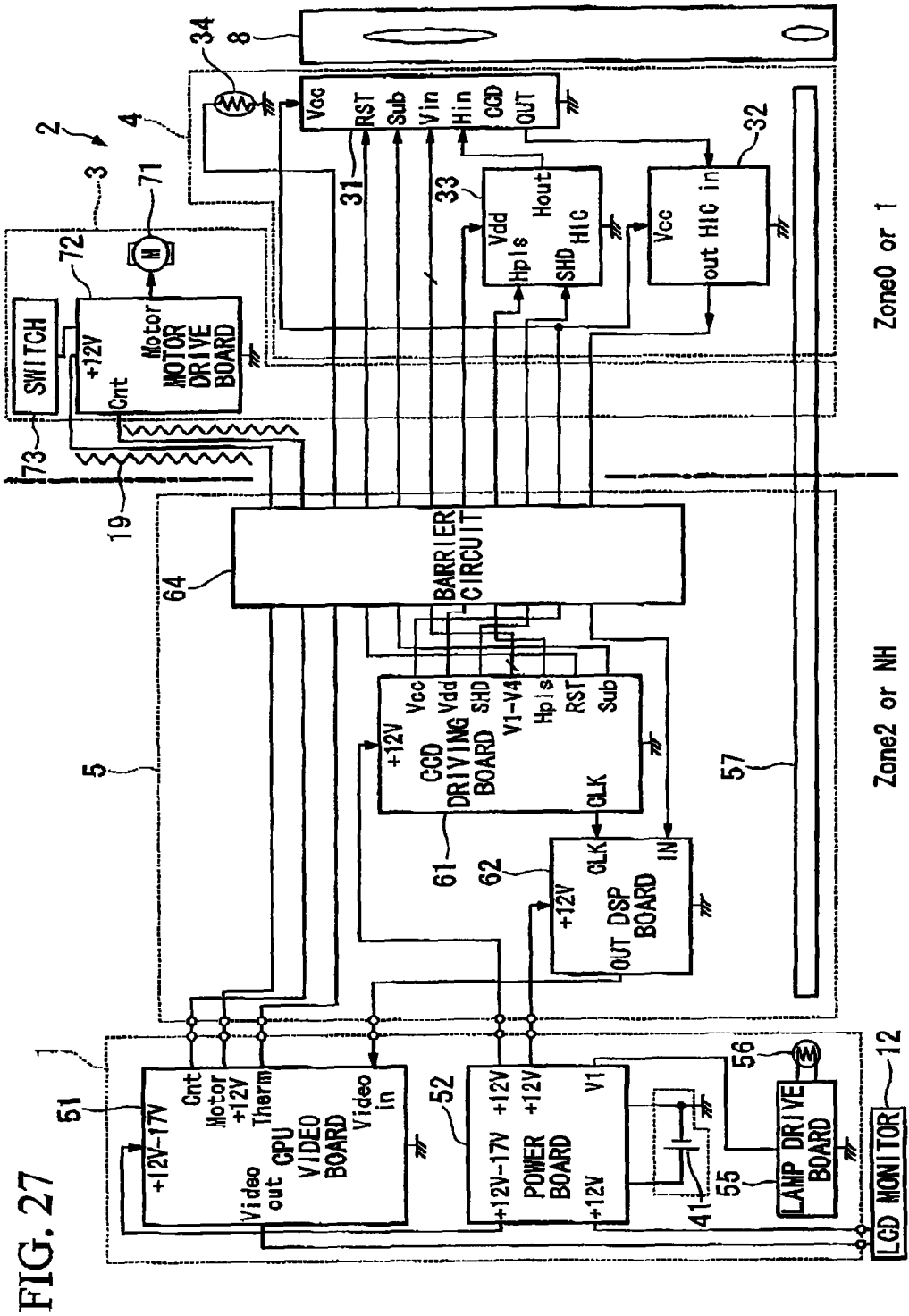
FIG. 27 is a block diagram showing the inner structure of a tenth embodiment of the present invention.

FIG. 27 shows a tenth embodiment of the present invention In the previous embodiments, the light source used for emitting the object is the LED module 36. In contrast, in the present embodiment, a lamp light source is used as the light source for emitting light on the object.

That is, a lamp 56 and a lamp-driving board 55 for driving the lamp 56 are disposed in the main unit 1 shown in FIG. 27. A power supply is supplied from the power board 52 to the lamp-driving board 55. The light emitted from the lamp 56 is introduced into the optical adaptor 8 via a light-guide 57.

In the tenth embodiment, the barrier circuit 64 is disposed in the scope connector 5, and the portion extending from the barrier circuit 64, i.e., the control unit 3, the insertion portion 4, and the optical adaptor 8 are of explosion-proof construction. Furthermore, an EX-LCD may be attachable to the control unit.

(11) Eleventh Embodiment

Figure 28:
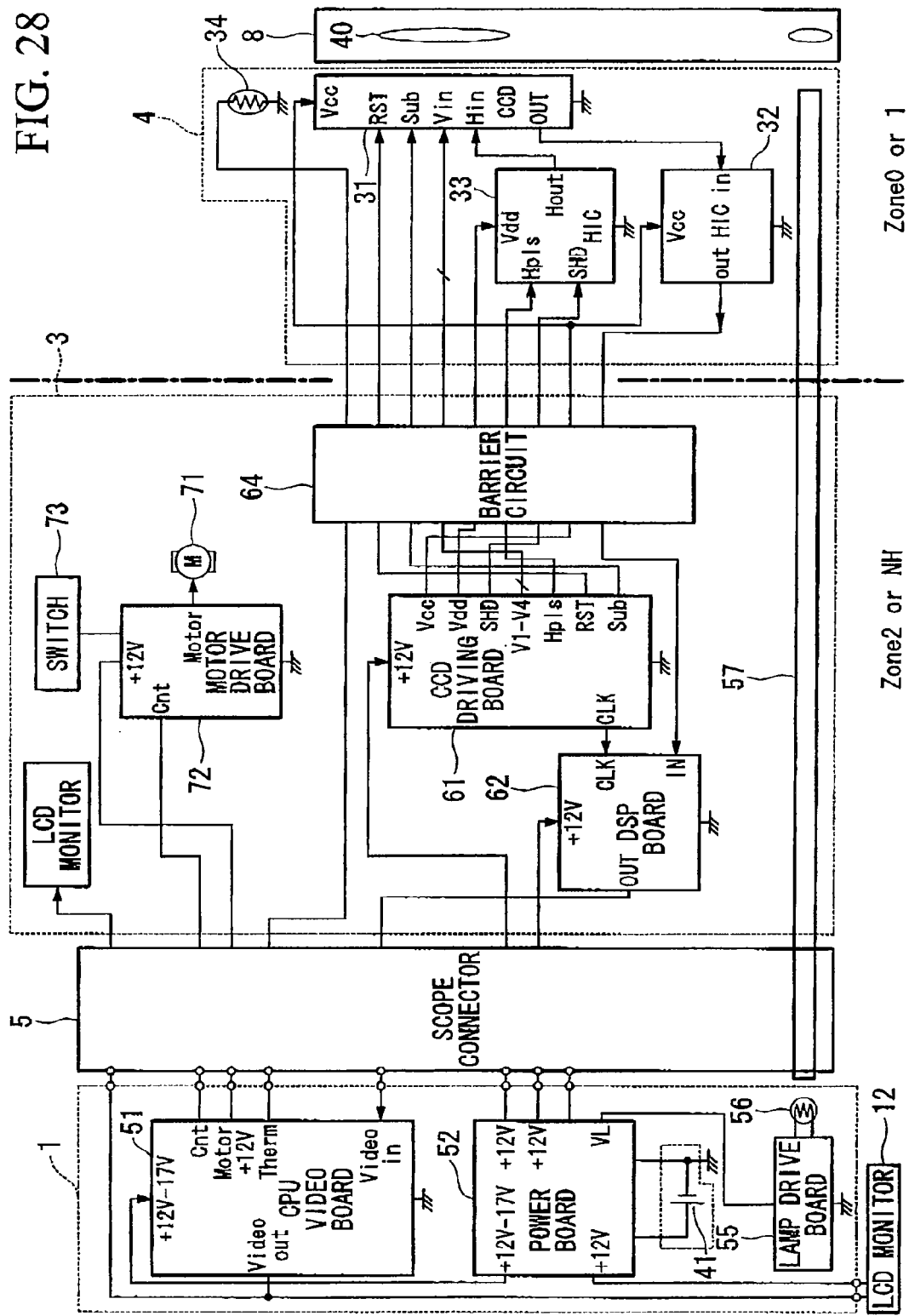
FIG. 28 is a block diagram showing the inner structure of an eleventh embodiment of the present invention.

FIG. 28 shows an eleventh embodiment of the present invention. In the present embodiment, similar to the tenth embodiment explained previously, the lamp 56 and a lamp-driving board 55 are disposed in the main unit 1 so as to emit light on the object by using a lamp light source.

In the tenth embodiment, the barrier circuit 64 is disposed in the scope connector 5. In contrast, in the eleventh embodiment, the CCD drive board 61, the DSP board 62, and the barrier circuit 64 are disposed in the control unit 3. Since the portion extending from the barrier circuit 64 is of explosion-proof construction, the insertion portion 4 and the optical adaptor 8 are of explosion-proof construction in the eleventh embodiment.

(12) Twelfth Embodiment

Figure 29:
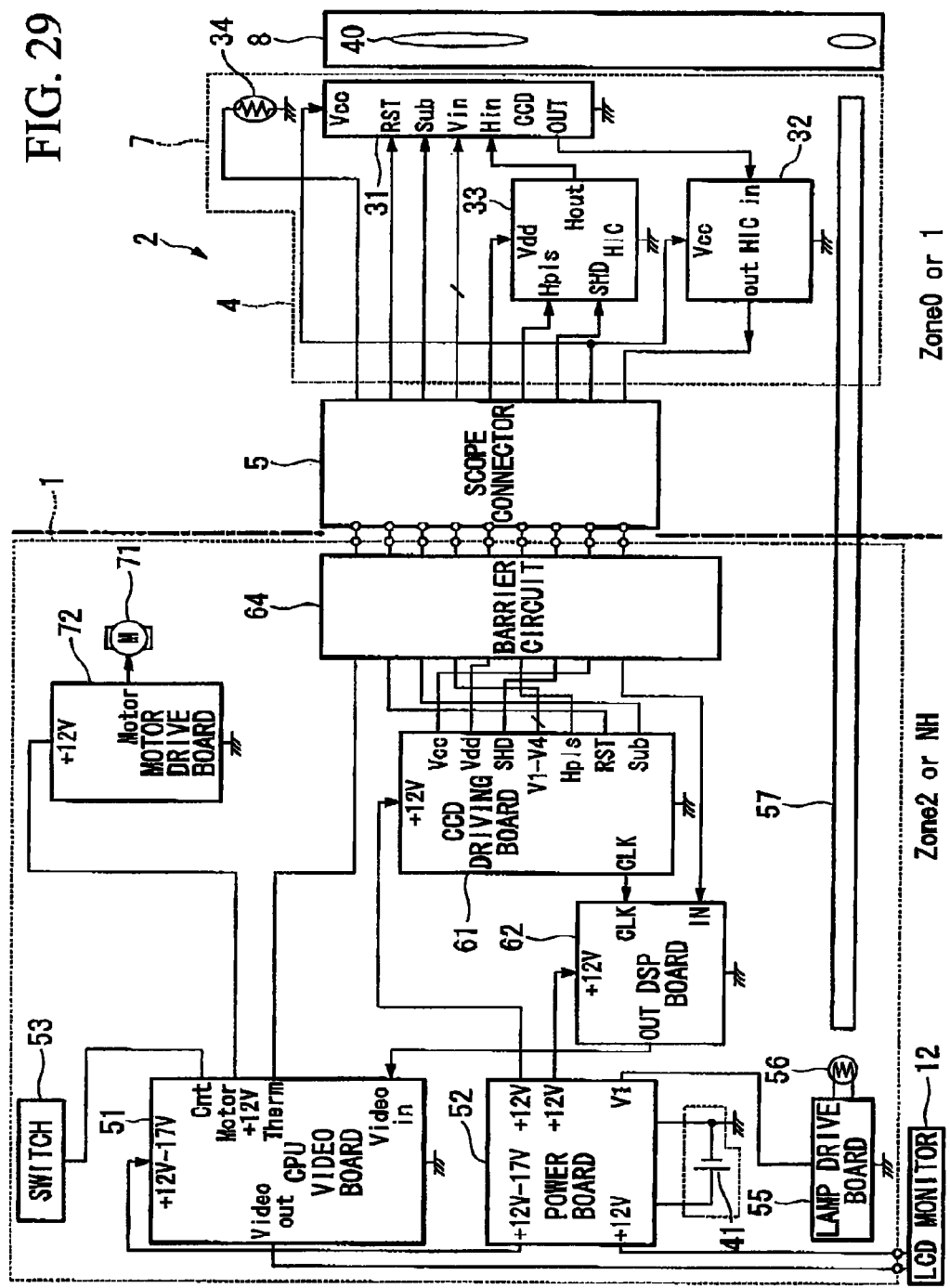
FIG. 29 is a block diagram showing the inner structure of a twelfth embodiment of the present invention.

FIG. 29 shows a twelfth embodiment of the present invention. In the present embodiment, similar to the tenth embodiment explained previously, the lamp 56 and a lamp-driving board 55 are disposed in the main unit 1 so as to emit a light on the object by using a lamp light source.

This embodiment is an example applied to the scope unit 2 not having a control unit. In the present embodiment, the insertion portion 4 extends from the main unit 1 through the scope connector 5, and all the operations are conducted from the main unit 1.

In the twelfth embodiment, the switch 53 for conducting various operations is disposed in the main unit 1. Also, the motor 71 for manipulating the bending portion 9 of the tip of the insertion portion 4 and the motor-driving board 72 are disposed in the main unit 1.

Also, in the twelfth embodiment, the CCD drive board 61 and the DSP board 62 are disposed in the main unit 1. In addition, the barrier circuit 64 is disposed posterior thereto. Since the portion extending from the barrier circuit 64 is of explosion-proof construction, the insertion portion 4 and the optical adaptor 8 are of explosion-proof construction in the twelfth embodiment.

(13) Thirteenth Embodiment

Figure 30:
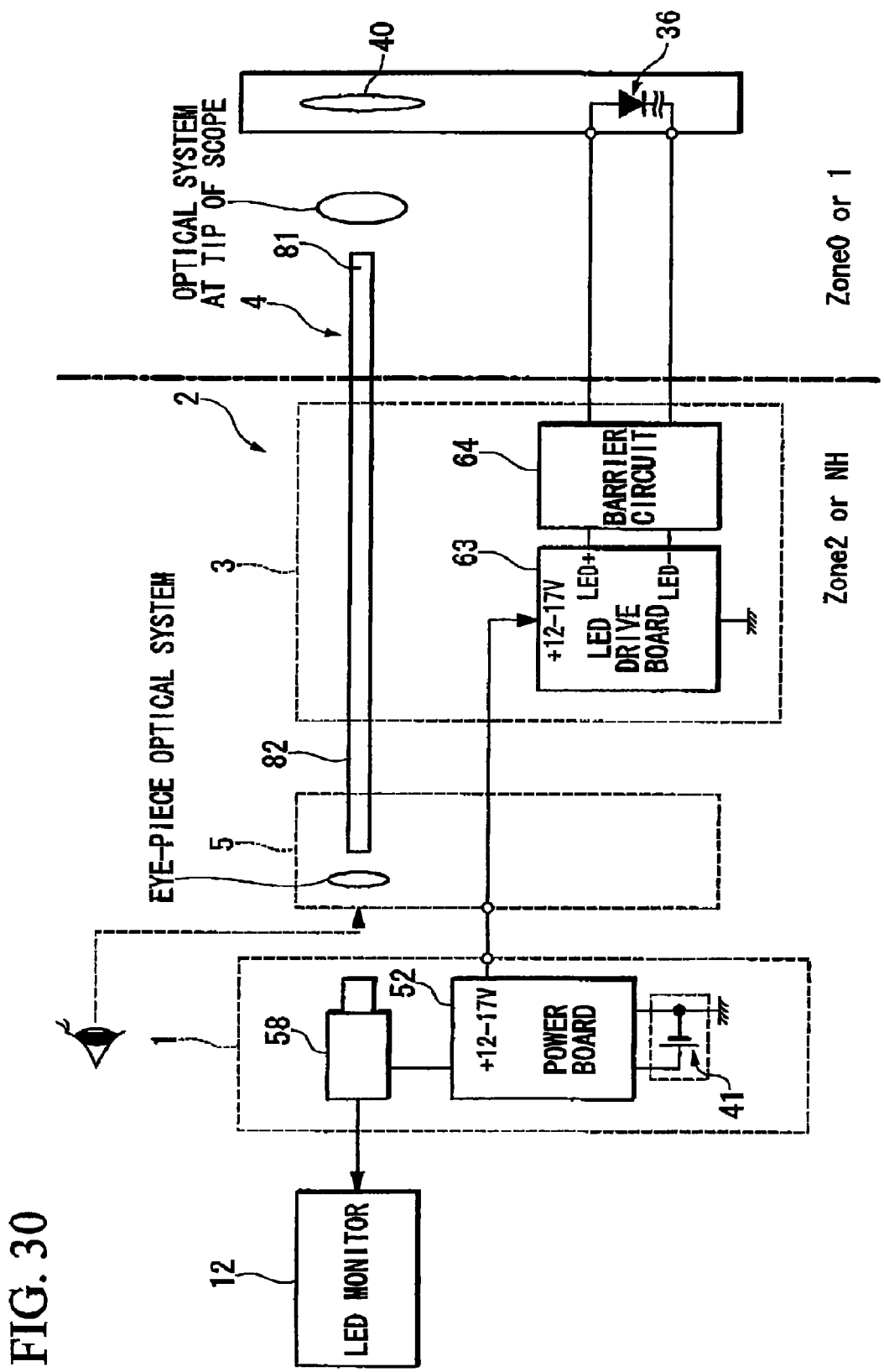
FIG. 30 is a block diagram showing the inner structure of a thirteenth embodiment of the present invention.

FIG. 30 shows a thirteenth embodiment of the present invention. In the previously explained embodiments, the CCD 31 is attached to the tip of the insertion portion 4 so as to monitor an image picked-up by this CCD 31. In contrast, in the thirteenth embodiment, an observed image is configured to be introduced to the main unit by using an image guide, for example, a fiber scope or a bore scope.

That is, in FIG. 30, a video camera 58 is provided in the main unit 1. A power supply is supplied from the power board 52 to the video camera 58. The LED drive board 63 and the barrier circuit 64 are disposed in the control unit 3.

An image guide 81 is disposed on the tip of the insertion portion 4, and the image from this image guide 81 is introduced to the scope connector 5 via the fiber scope 82 or the bore scope.

This image is picked up by the video camera 58 and displayed on the LCD monitor 12.

In the thirteenth embodiment, the LED drive board 63 is disposed in the control unit 3, and the barrier circuit 64 is disposed posterior thereto. Since the portion extending from the barrier circuit 64 is of explosion-proof construction, the insertion portion 4 and the optical adaptor 8 are of explosion-proof construction in the thirteenth embodiment.

(14) Fourteenth Embodiment

Figure 31:
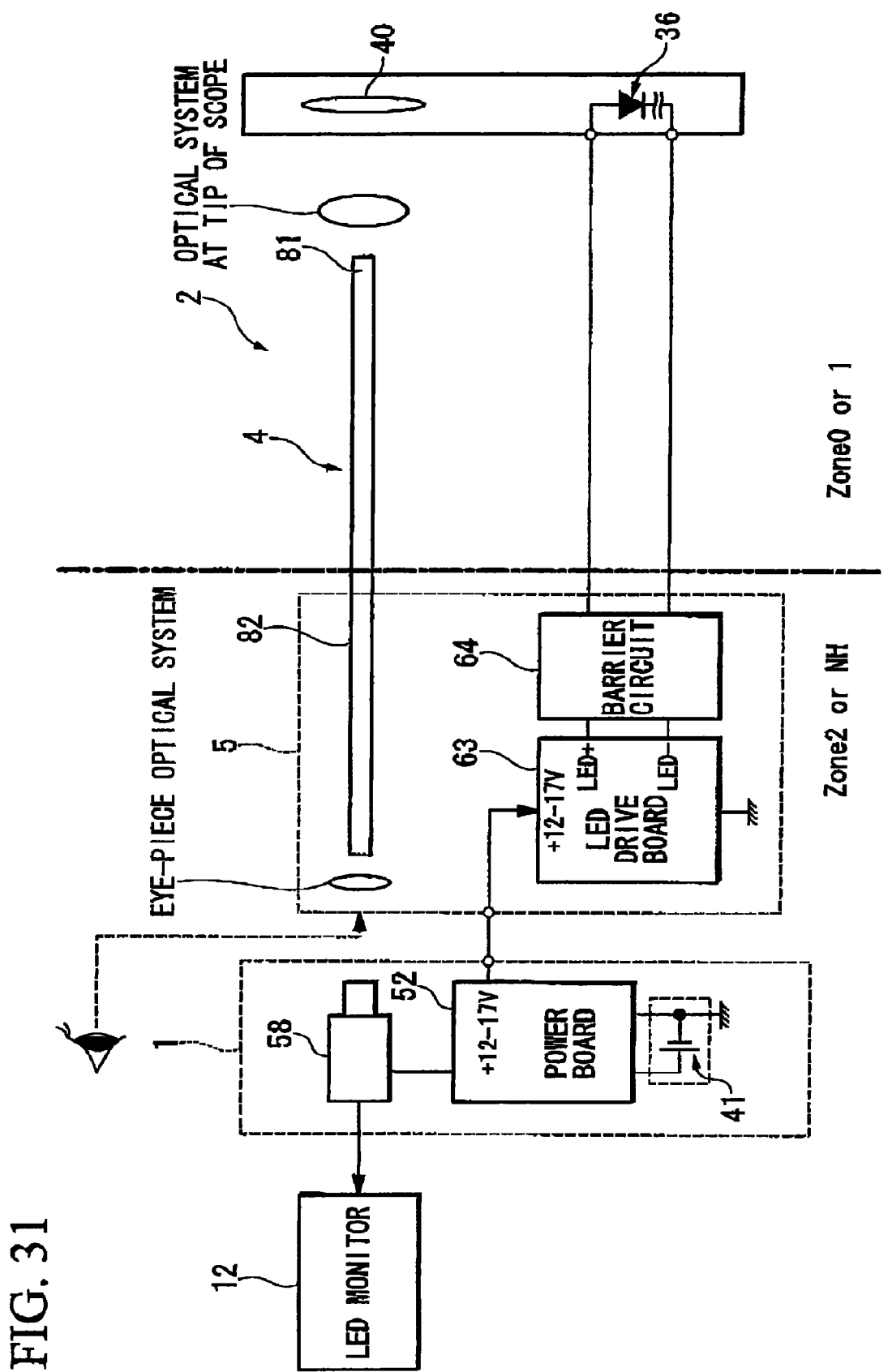
FIG. 31 is a block diagram showing the inner structure of a fourteenth embodiment of the present invention.

FIG. 31 shows a fourteenth embodiment of the present invention. In the present embodiment, similar to the previously-explained thirteenth embodiment, an observed image is configured to be introduced to the main unit by using an image guide, for example, a fiber scope or a bore scope.

In the previously-explained thirteenth embodiment, the LED drive board 63 and the barrier circuit 64 are disposed in the control unit 3, and in contrast, in the present embodiment, the LED drive board 63 and the barrier circuit 64 are disposed in the scope connector 5, i.e., the control unit 3 is not provided therein. Since the portion extending from the barrier circuit 64 is of explosion-proof construction, the insertion portion 4 and the optical adaptor 8 are of explosion-proof construction in the fourteenth embodiment.

(15) Fifteenth Embodiment

Figure 32:
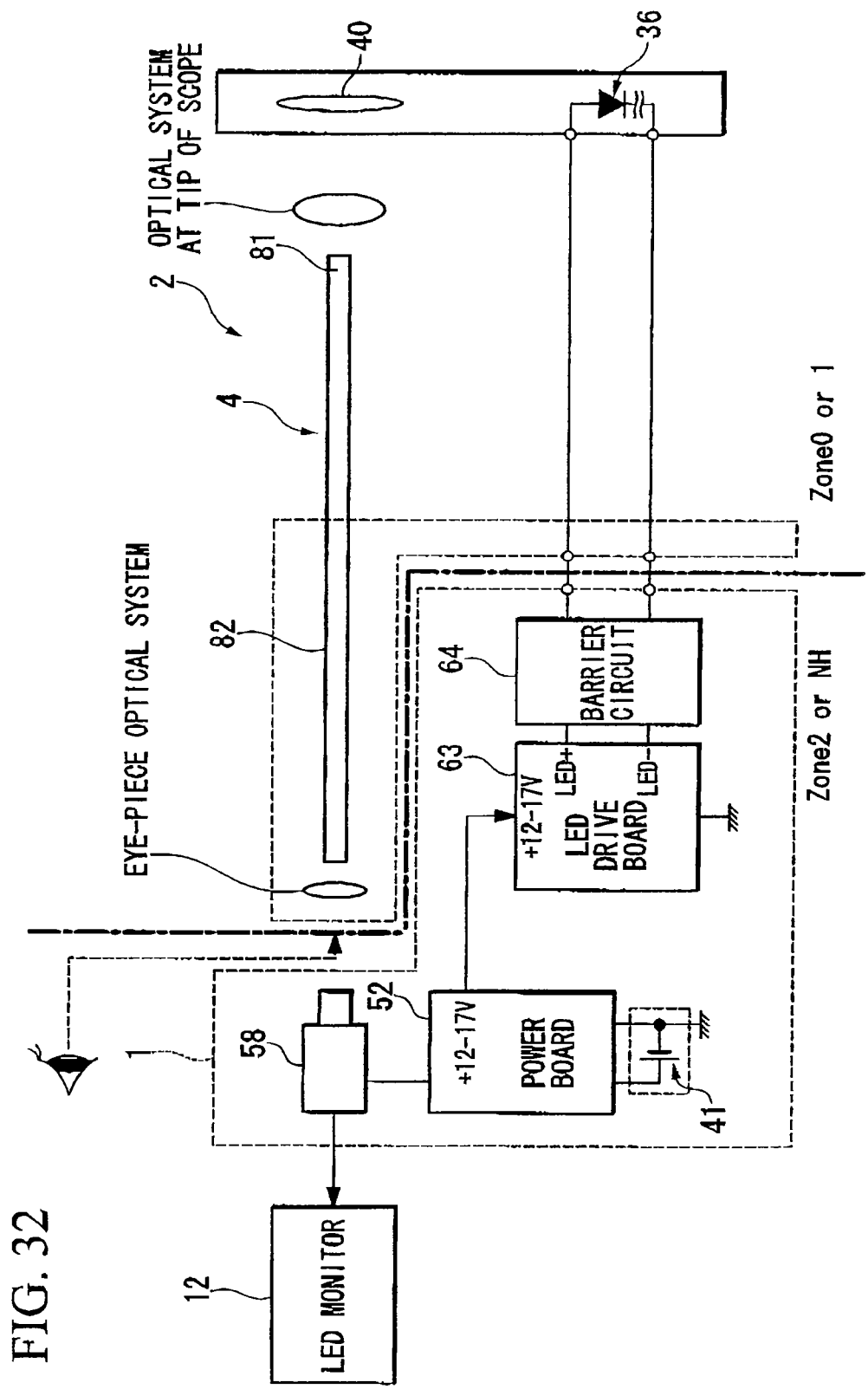
FIG. 32 is a block diagram showing the inner structure of a fifteenth embodiment of the present invention.

FIG. 32 shows a fifteenth embodiment of the present invention. In the present embodiment, similar to the previously-explained thirteenth embodiment, an observed image is configured to be introduced to the main unit by using an image guide, for example, a fiber scope or a bore scope.

In the previously explained thirteenth embodiment, the LED drive board 63 and the barrier circuit 64 are disposed in the control unit 3, and in contrast, in the present embodiment, the LED drive board 63 and the barrier circuit 64 are disposed in the main unit 1, i.e., the control unit 3 is not provided therein. Since the portion extending from the barrier circuit 64 is of explosion-proof construction, the scope connector 5, the insertion portion 4, and the optical adaptor 8 are of explosion-proof construction in the thirteenth embodiment.

Figure 33A:
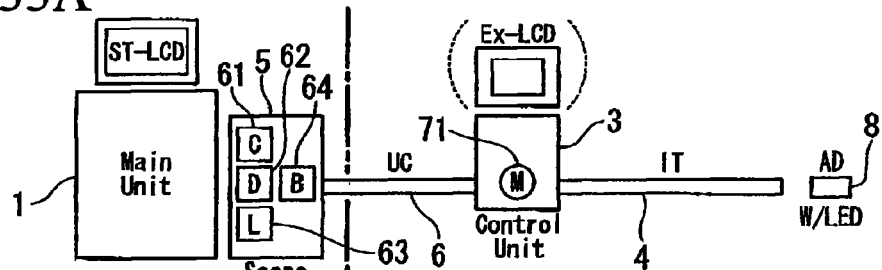
FIGS. 33A to 33E comprehensively show general configurations including main structural sections and specific areas with respect to the above first to ninth embodiments.
Figure 33B:
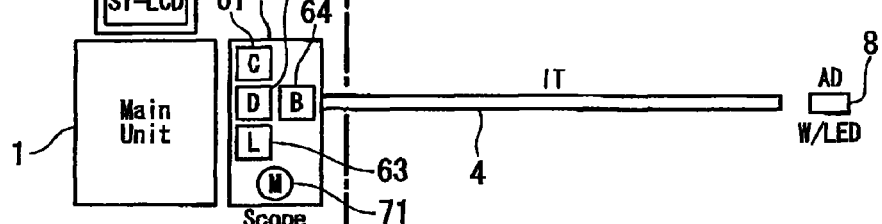
Figure 33C:
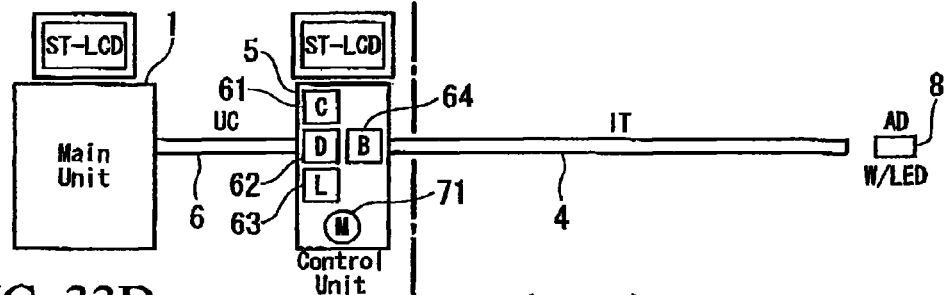
Figure 33D:
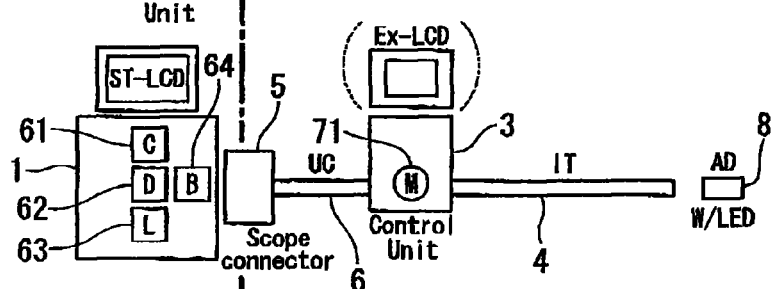
Figure 33E:
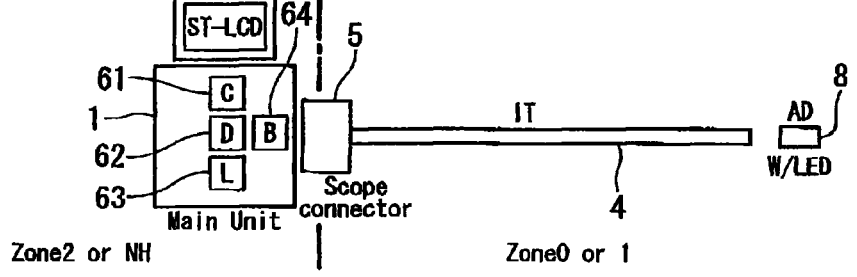
Figure 34F:
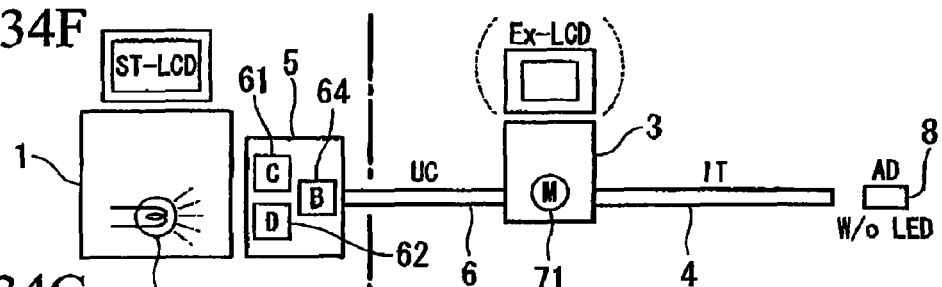
FIGS. 34F to 34K comprehensively show general configurations including main structural sections and specific areas with respect to the above tenth to fifteenth embodiments.
Figure 34G:
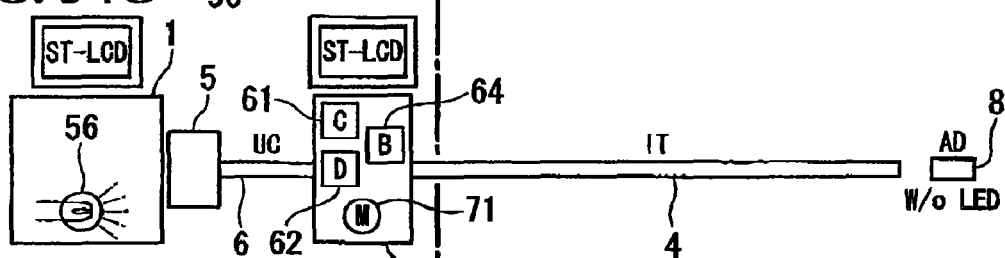
Figure 34H:
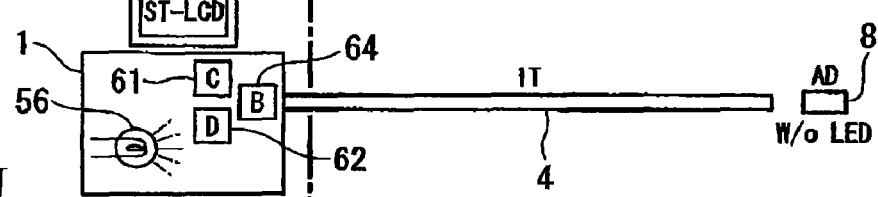
Figure 34I:
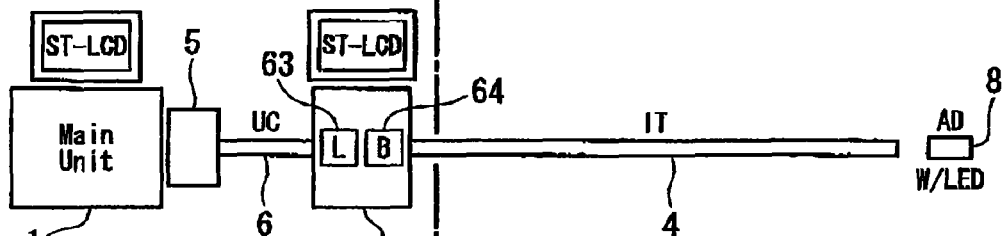
Figure 34J:
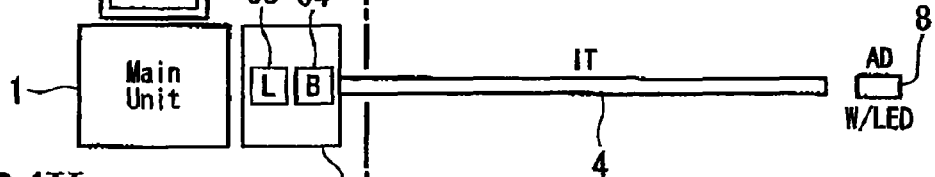
Figure 34K:
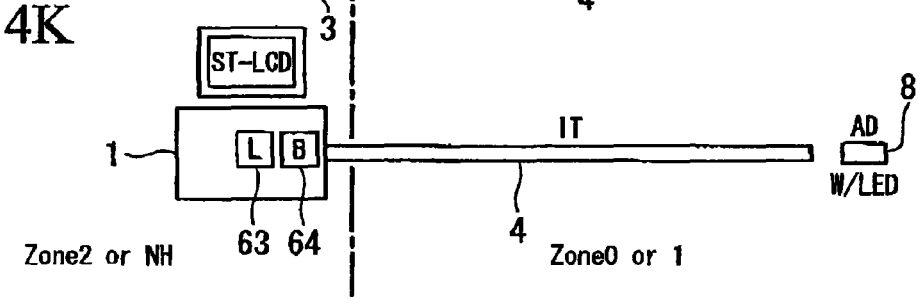

Furthermore, FIGS. 33A to 33E and FIGS. 34F to 34K are general views compatibly showing main components and main areas in the above embodiments. That is, FIG. 33A shows general configurations of the above-explained first to fourth embodiments; FIG. 33B shows a general configuration of the fifth embodiment; FIG. 33C shows a general configuration of the sixth embodiment; FIG. 33D shows a general configurations of the above-explained seventh and eighth embodiments; arid FIG. 33E shows a general configuration of the above ninth embodiment. In addition, FIG. 34F shows a general configuration of the above-explained tenth embodiments; FIG. 34G shows a general configuration of the above eleventh embodiment; FIG. 34H shows a general configuration of the above twelfth embodiment; FIG. 34I shows a general configuration of the above thirteenth embodiment; FIG. 34J shows a general configuration of the above fourteenth embodiment; and FIG. 34K shows a general configuration of the above fifteenth embodiment.

The present invention is not limited to the above-explained embodiments, i.e., various modifications and alternative forms are possible within the scope and spirit of the present invention.

Although examples for driving the image pickup device, for example, CCD, and receiving the signals has been explained in detail with reference to the embodiments of the present application, explosion-proof construction can be realized in other types of sensors, for example, a CMOS image pickup devices driven by energy limited by the barrier circuit of the similar concept.

Furthermore, although the tenth to twelfth embodiments have shown configuration examples in which a lamp is disposed in the main unit, the light-emitting sections may be realized by replacing the lamp light source with a LED-light-source section or a laser-light-emitting section.

In the embodiments of the present application, any secondary batteries can be used, for example, a lithium-ion battery, a lead battery, a nickel hydride battery, or a fuel cell.

Mobility can be enhanced by using batteries for supplying power to the endoscope system of the present application. In addition, total amount of energy supplied to the system is limited to the energy that can he supplied from the batteries.

Therefore, since energy is not supplied from an AC power supply using an AC adapter, etc., the endoscope system does not need to be grounded. Accordingly, the total amount of the energy supplied in an abnormal condition may be considered in view of the regulation based on the IEC 60097. Therefore, a small, light-weight, and simple configuration of the energy-limiting circuit can be realized.

Furthermore, in the present application, although an optical adapter is attached to the tip of the scope unit detachably, an insertion portion and the scope unit may be formed unitarily so that the optical adapter is not detachable. In such a case, there is an advantage in that the length of a hard section, i.e., the tip of the scope can be shortened.

In addition, although the display section in the present application uses an LCD unit using an LCD panel, the display section used in the present invention is not limited to the LCD panel. That is, organic EL panels and LED panels may be used. If these display sections are of explosion-protection-construction, these explosion-protection LCDs can be used in the hazardous areas, for example, Zones 0, 1, and 2. In particular, since the LCD unit may be of Type-n apparatus in order to be used in the Zone 2, i.e., the LCD unit will be smaller, lighter, less expensive, and easier to use than apparatuses categorized in the ia apparatus and ib apparatus based on the regulation concerning the intrinsically-safe-construction.

The present invention can be used for endoscopes for maintaining pipes in plants and buildings, inspecting the inside of jet engines and gasoline tanks and boilers.

What is claimed is:

1. An endoscope apparatus configured for use in a potentially explosive environment, the endoscope apparatus comprising:
    a scope unit having a control unit;
    an image pickup element disposed at a tip of the scope unit;
    an insertion portion connected to the control unit;
    a main unit connected to the scope unit and the control unit;
    a barrier circuit disposed in the scope unit which uses a zener diode connected to ground so as to limit energy applied to a circuit; and
    an image pickup element drive board disposed in the scope unit so as to produce various pulses for driving the image pick up element and to produce a power supply,
    wherein the barrier circuit is configured to pass an output signal to the image pickup element and an input signal from the image pickup element and the barrier circuit is further configured to limit an output signal from the image pickup element drive board, to an extent sufficient to eliminate the output signal as a factor in causing explosion in said potentially explosive environment, and;
    wherein the barrier circuit includes a circuit device coated with an electrically insulating material.

2. An endoscope apparatus according to claim 1, wherein said barrier circuit is substantially disposed at an edge of the main unit and the insertion portion; and
    in order to limit direct-current energy, to an extent sufficient to eliminate the direct-current energy as a factor in causing explosion in said potentially explosive environment, the barrier circuit uses at least three zener diodes and a resistance,
    in order to limit alternating energy, to an extent sufficient to eliminate the alternating energy as a factor in causing explosion in said potentially explosive environment, the barrier circuit uses at least three coupling condensers,
    in order to limit direct-current energy and alternating-current energy, to an extent sufficient to eliminate the direct-current and alternating energy as factors in causing explosion in said potentially explosive environment, the barrier circuit uses at least three zener diodes, a resistance, and at least three coupling condensers in combination thereof,
    so that the portion extending from the barrier circuit is of an explosion-proof construction based on explosion-protection regulations.

3. An industrial endoscope apparatus according to claim 1, further comprising a fuse inserted into the circuit in order to limit the direct-current energy.

4. An endoscope apparatus according to claim 1, wherein said barrier circuit is substantially disposed at an edge of the main unit and the insertion unit; and
    in order to limit direct-current energy, to an extent sufficient to eliminate the direct-current energy as a factor in causing explosion in said potentially explosive environment, the barrier circuit uses a current-limiting circuit using at least a resistance or two semiconductors, and at least two zener diodes,
    in order to limit alternating energy, to an extent sufficient to eliminate the alternating energy as a factor in causing explosion in said potentially explosive environment, the barrier circuit uses at least two coupling condensers, and
    in order to limit direct-current energy and alternating-current energy, to an extent sufficient to eliminate the direct-current and alternating energy as factors in causing explosion in said potentially explosive environment, the barrier circuit uses a current-limiting circuit using at least a resistance or two semiconductors, and at least two coupling condensers in combination thereof,
    so that the portion extending from the barrier circuit is of an explosion-proof construction based on explosion-protection regulations.

5. An endoscope apparatus according to claim 4, further comprising a fuse inserted into the circuit in order to limit the direct-current energy.

6. An endoscope apparatus according to claim 1, wherein the scope unit is further provided with a scope connector connected to the main unit detachably,
    the barrier circuit is disposed in the scope connector, and the portion extending from the scope connector is of explosion-proof construction.

7. An endoscope apparatus according to claim 1, wherein the portion extending from the barrier circuit is provided with an identification section so that the portion can be identified.

8. An endoscope apparatus according to claim 1, wherein the energy for driving the image pickup element is limited by the barrier circuit.

9. An endoscope apparatus according to claim 8, wherein the barrier circuit for limiting the energy for driving the image pickup element limits energy in a pulse transmitted to the image pickup element and serves as a differentiating circuit for reshaping waveforms.

10. An endoscope apparatus according to claim 8, wherein the barrier circuit, is disposed prior to a pre-amplifier, for limiting the energy of picked up image applied to terminals of the image-capturing element output from the image pickup element serves as a matching resistance.

11. An endoscope apparatus according to claim 8, further comprising an insulating member for covering at least one of a signal line extending from the image-capturing element to the tip of the scope unit and other signal lines.

12. An endoscope apparatus according to claim 1, further comprising:
    a light-emitting element disposed onto the tip of the scope unit, wherein
    the energy for driving the light-emitting element is limited by the barrier circuit.

13. An endoscope apparatus according to claim 12, wherein
    the light-emitting element is driven by a positive potential with respect to ground and by a negative potential with respect to ground.

14. An endoscope apparatus according to claim 12, wherein
    an optical image from the tip of the scope unit is introduced to the main unit via a fiber scope or a bore scope,
    a light-emitting element is disposed on the tip of the scope unit,
    the energy for driving the light-emitting element is limited by the barrier circuit.

15. An endoscope apparatus according to claim 12, wherein the light-emitting element is an LED light-emitting section.

16. An endoscope apparatus according to claim 1, further comprising:
    a temperature sensor for measuring a peripheral temperature of the object disposed onto the tip of the scope unit so that the energy of output measured by the temperature sensor is limited by the barrier circuit.

17. An endoscope apparatus according to claim 1, further comprising a motor for bending the insertion portion of the scope unit, wherein
    the energy for driving the motor is limited by the barrier circuit.

18. An endoscope apparatus according to claim 1, further comprising operation switches for various operations, wherein the energy of logic signals from the switches is limited by the barrier circuit.

19. An endoscope apparatus according to claim 1, further comprising:
    a lighting section is disposed in the main unit, wherein
    the light emission from the lighting section is introduced by an optical guide and emitted from the tip of the scope unit, and
    the energy for driving the image pickup element is limited by the barrier circuit.

20. An endoscope apparatus according to claim 1, wherein in order to limit direct-current energy, the barrier circuit uses at least two zener diodes.

21. An endoscope apparatus configured for use in a potentially explosive environment, the endoscope apparatus comprising:
    a scope unit including a control unit;
    an image pickup element disposed at a tip of the scope unit;
    an insertion portion connected to the control unit;
    a main unit connected to the scope unit and the control unit;
    a barrier circuit disposed in the scope unit which includes a zener diode connected to ground and configured to limit energy applied to a circuit, to an extent sufficient to eliminate the energy as a factor in causing explosion in said potentially explosive environment, and
    an image pickup element drive board disposed in the scope unit so and configured to produce various pulses for driving the image pick up element and to produce a power supply,
    wherein the barrier circuit is configured to pass an output signal to the image pickup element and an input signal from the image pickup element, the barrier circuit is further configured to limit an output signal from the image pickup element drive board, to an extent sufficient to eliminate the output signal as a factor in causing explosion in said potentially explosive environment, and the barrier circuit includes a circuit device coated with an electrically insulating coating material so as to shorten a distance between circuit patterns of the barrier circuit.

22. The endoscope apparatus according to claim 21, wherein the coating material is a silicon coating material.

* * * * *